US012318796B2

(12) United States Patent
Bachman et al.

(10) Patent No.: US 12,318,796 B2

(45) Date of Patent: Jun. 3, 2025

(54) SELF FLUSHING FLOW RESTRICTOR FOR A FLUID DISPENSING SYSTEM

(71) Applicant: NORDSON CORPORATION, Westlake, OH (US)

(72) Inventors: Jim Bachman, Lorain, OH (US); Madeline Oswalt, Lakewood, OH (US); Todd Frenk, Amherst, OH (US)

(73) Assignee: Nordson Corporation, Westlake, OH (US)

( * ) Notice: Subject to any disclaimer, the term of this patent is extended or adjusted under 35 U.S.C. 154(b) by 68 days.

(21) Appl. No.: 17/907,689

(22) PCT Filed: Mar. 23, 2021

(86) PCT No.: PCT/US2021/023566

§ 371 (c)(1),
(2) Date: Sep. 29, 2022

(87) PCT Pub. No.: WO2021/202150

PCT Pub. Date: Oct. 7, 2021

(65) Prior Publication Data

US 2023/0127434 A1 Apr. 27, 2023

Related U.S. Application Data

(60) Provisional application No. 63/001,826, filed on Mar. 30, 2020.

(51) Int. Cl.
*F15D 1/02* (2006.01)
*B05B 15/52* (2018.01)
(Continued)

(52) U.S. Cl.
CPC ............ *B05B 15/52* (2018.02); *B05B 15/534* (2018.02); *B05B 15/55* (2018.02); *F15D 1/025* (2013.01); *B05B 15/40* (2018.02); *B05B 15/58* (2018.02)

(58) Field of Classification Search
CPC ................. F16K 5/0605; F16K 5/0657; Y10T 137/7036; Y10T 137/0402; B05B 15/52;
(Continued)

(56) References Cited

U.S. PATENT DOCUMENTS 3,386,461 A * 6/1968 Fisher ........................ F16K 5/10 251/207
3,707,161 A * 12/1972 Crawford .............. F16K 5/0605 137/269
(Continued)

FOREIGN PATENT DOCUMENTS

CN 110653077 B 4/2021
EP 0482904 A1 4/1992
(Continued)

OTHER PUBLICATIONS

IPEA/409—International Preliminary Report on Patentability Mailed on Oct. 13, 2022 for WO Application No. PCT/US21/023566.
(Continued)

*Primary Examiner* — Marina A Tietjen
(74) *Attorney, Agent, or Firm* — BakerHostetler

(57) ABSTRACT

In one example, a fluid flow restrictor has a housing outlet offset from a housing inlet along a fluid flow direction so as to define a channel therebetween. A rotatable body that is disposed in the channel defines a bore that extends entirely therethrough such that the bore defines a bore inlet and a bore outlet. The flow restrictor has an interior surface disposed in the bore that defines an orifice having a cross-sectional dimension that is less than a cross-sectional dimension of the channel such that the orifice can restrict a flow of fluid as the fluid flows between the housing inlet and outlet. The rotatable body is rotatable between 1) a first orientation, where the bore outlet is offset from the bore inlet along the fluid flow direction, and 2) a second orientation, where the bore inlet is offset from the bore outlet along the fluid flow direction.

20 Claims, 13 Drawing Sheets

(51) Int. Cl.

| | |
|---|---|
| ***B05B 15/534*** | (2018.01) |
| ***B05B 15/55*** | (2018.01) |
| *B05B 15/40* | (2018.01) |
| *B05B 15/58* | (2018.01) |

(58) Field of Classification Search

CPC ....... B05B 15/55; B05B 1/1636; B05B 15/40; B05B 15/58; B05B 15/534; F16L 55/02718; F15D 1/025

See application file for complete search history.

(56) References Cited

U.S. PATENT DOCUMENTS

| | | | | |
|---|---|---|---|---|
| 5,060,861 | A | 10/1991 | Holt | |
| 5,205,533 | A * | 4/1993 | Berchem | F16K 5/0605 251/118 |
| 7,219,877 | B1 * | 5/2007 | Mogas | F16K 5/0605 251/207 |
| 2018/0266090 | A1 | 9/2018 | Tanghetti et al. | |

FOREIGN PATENT DOCUMENTS

| | | | |
|---|---|---|---|
| EP | 3376081 | A1 | 9/2018 |
| GB | 2249158 | A | 4/1992 |
| JP | 62-079865 | A | 4/1987 |
| JP | 2005-046779 | A | 2/2005 |

OTHER PUBLICATIONS

ISA/220—Notification of Transmittal or Search Report and Written Opinion of the ISA, or the Declaration Mailed on Jul. 23, 2021 for WO Application No. PCT/US21/023566.

* cited by examiner

SELF FLUSHING FLOW RESTRICTOR FOR A FLUID DISPENSING SYSTEM

CROSS REFERENCE TO RELATED APPLICATIONS

This application is a National Stage Application of International Patent App. No. PCT/US2021/023566, filed Mar. 23, 2021, which claims the benefit of U.S. Provisional Patent App. No. 63/001,826, filed Mar. 30, 2020, the entire disclosures of both of which are hereby incorporated by reference as if set forth in their entirety herein.

TECHNICAL FIELD

This disclosure generally relates to fluid material dispensing systems, and more particularly to flow restrictor of the fluid dispensing systems and methods of using the same.

BACKGROUND

In some fluid dispensing systems, a flow restrictor is used to reduce the pressure of fluid from one part of the system to another part of the system. For example, in a spray coating system that spray coatings onto products, a pump may supply fluid to a spray gun at a first pressure, and a spray pressure control manifold having a flow restrictor may reduce the pressure of any unused fluid that is not sprayed by the spray gun to a second pressure, lower than the first pressure, before returning the fluid to the pump. To reduce the pressure, the flow restrictor may employ an orifice in the flow path that has a smaller dimension than other passages in the flow path. The smaller orifice can restrict the flow of fluid returning to the pump.

SUMMARY

In one example, a fluid flow restrictor of a spray pressure control system comprises a housing that comprises a housing inlet, a housing outlet offset from the housing inlet along a fluid flow direction, and a channel that extends between the housing inlet and housing outlet. The fluid flow restrictor comprises a rotatable body disposed in the channel between the housing inlet and the housing outlet. The rotatable body has an outer surface that is curved about an axis of rotation. The rotatable body defines a bore that extends entirely through the rotatable body such that the bore defines a bore inlet at the outer surface, and a bore outlet at the outer surface that is offset from the bore inlet. The fluid flow restrictor comprises an interior surface disposed in the bore. The rotatable body is rotatable between 1) a first orientation in which the bore outlet is offset from the bore inlet along the fluid flow direction, and 2) a second orientation in which the bore inlet is offset from the bore outlet along the fluid flow direction.

BRIEF DESCRIPTION OF THE DRAWINGS

The following description of the illustrative examples may be better understood when read in conjunction with the appended drawings. It is understood that potential examples of the disclosed systems and methods are not limited to those depicted.

DETAILED DESCRIPTION

Conventional fluid flow restrictors, such as those described in the background, can become clogged over time thereby adversely affect a performance of the fluid dispensing system. Consequently, conventional fluid flow restrictors may need to be cleaned from time to time to remove clogs. However, cleaning conventional fluid flow restrictors commonly requires that the fluid flow restrictor is disassembled to access the restricting orifice and flush the line to clear the clog. Such cleaning operations can be time consuming and require the fluid dispensing system to be taken offline, which can cause production delays. Therefore, there is a need for fluid flow restrictors that can be cleaned without disassembly and without time consuming production delays.

Figure 2:
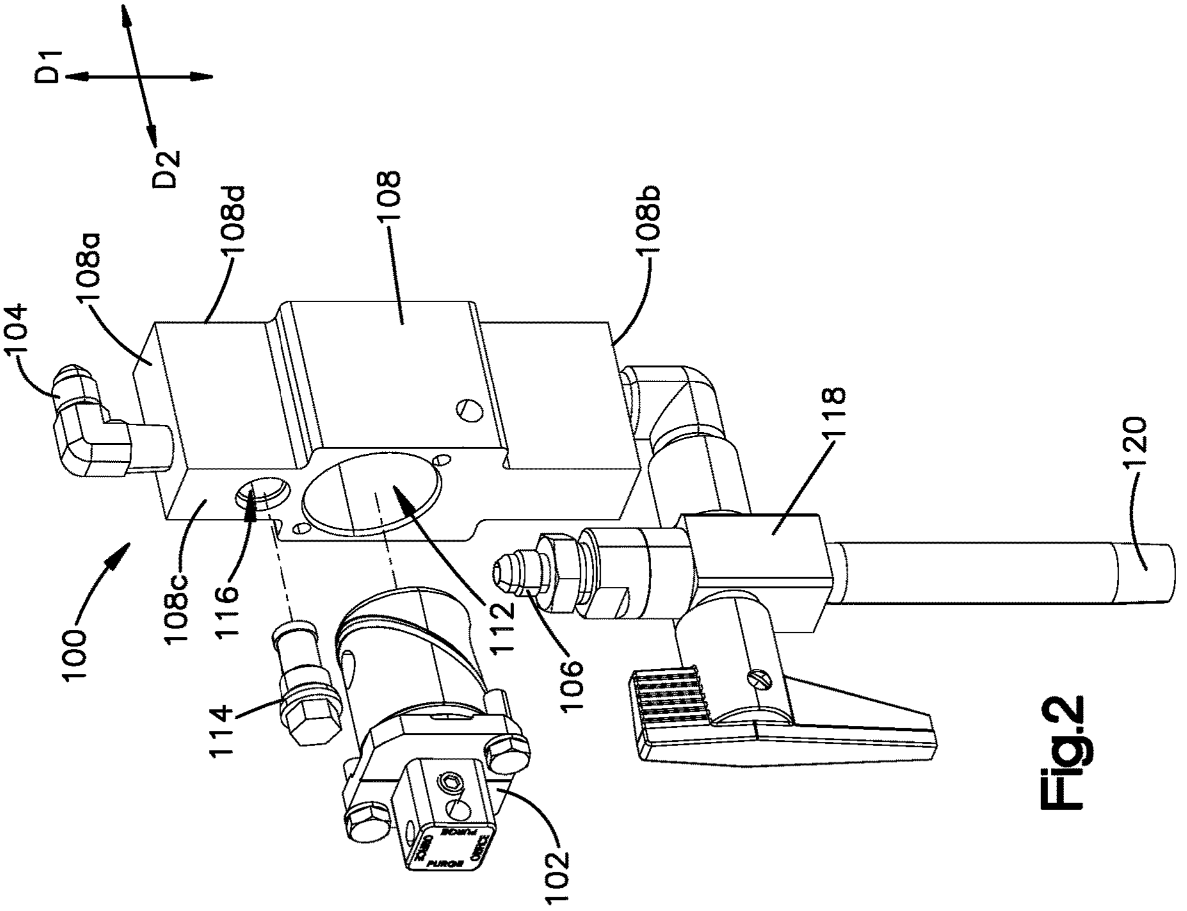
FIG. 2 shows a partially exploded perspective view of the spray pressure control manifold of FIG. 1.
Figure 1:
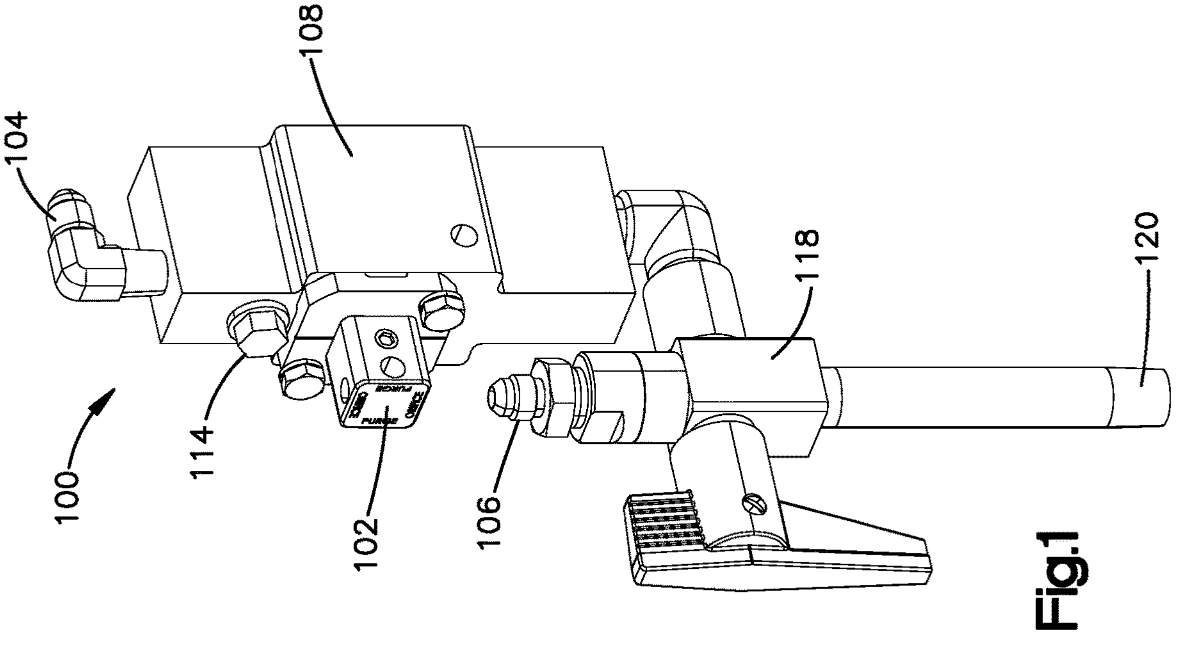
FIG. 1 shows a perspective view of a spray pressure control manifold according to one example.
Figure 3:
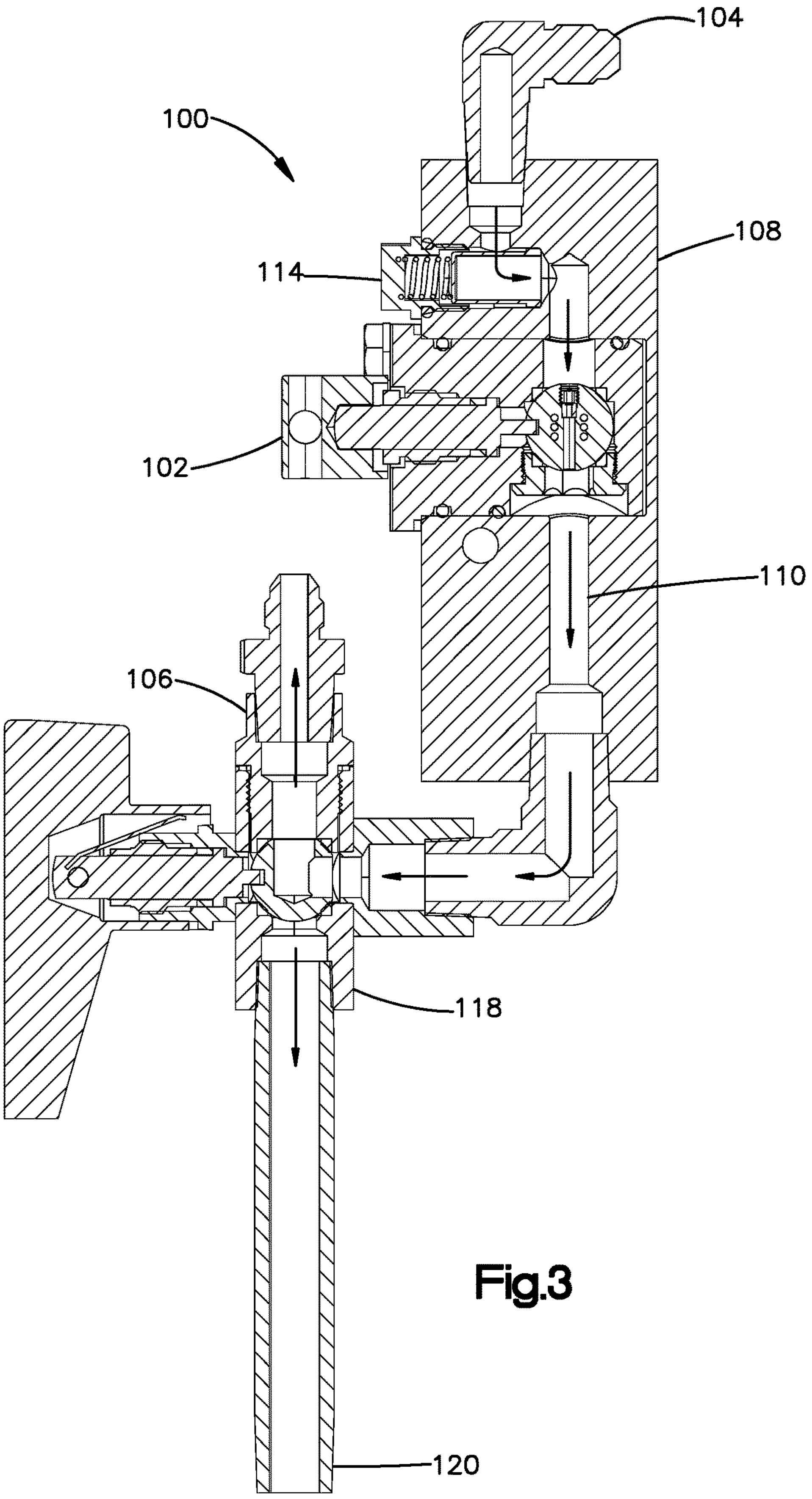
FIG. 3 shows a cross-sectional view of the spray pressure control manifold of FIG. 1.

Referring to FIGS. 1 to 3, a spray pressure control manifold 100 is shown according to one example. The spray pressure control manifold 100 comprises a flow restrictor 102 that reduces pressure fluctuations in the fluid system. As will be described in further detail below, the flow restrictor 102 can be selectively operated in a first orientation, wherein a restricting orifice (e.g., 130 in FIG. 10) of the flow restrictor 102 is oriented to restrict a flow of fluid through the pressure control manifold 100, and a second orientation, wherein the restricting orifice is oriented so as to be flushed to remove clogs that arise when the flow restrictor 102 is in the first orientation. The flow restrictor 102 can be transitioned between the first and second orientations without disassembling the manifold 100.

The spray pressure control manifold 100 can have a manifold inlet 104, and a manifold outlet 106 that is downstream of the manifold inlet 104 with respect to a fluid flow path, which may also be referred to as a fluid flow direction or a downstream direction, of fluid through the manifold 100. The flow path or flow direction is indicated by the arrows in FIG. 3. The manifold inlet 104 can be defined by a conduit such as a pipe, a pipe nipple, a pipe fitting, or any other suitable conduit for an inlet. Similarly, the manifold outlet 106 can be defined by a conduit such as a pipe, a pipe nipple, a pipe fitting, or any other suitable conduit for an outlet.

The manifold 100 can have a manifold housing 108 that is configured to support at least a portion of the flow restrictor 102 therein. In this example, the fluid flow restrictor 102 can be considered to be a cartridge that is configured to be received in the manifold housing 108. The housing 108 can be disposed along the flow path between the manifold inlet 104 and the manifold outlet 106. The housing 108 can define a passageway 110 therethrough that defines at least a portion of the flow path of the manifold 100. Thus, the passageway 110 can be in fluid communication with the manifold inlet 104 and the manifold outlet 106. The housing 108 can support the flow restrictor 102 such that the restricting orifice of the flow restrictor 102 is disposed within the flow path. For example, the housing 108 can define a recess 112 therein that is configured to receive at least a portion of the flow restrictor 102. The recess 112 can be open to, and in fluid communication with, the passageway 110 of the housing 108. The recess 112 can be configured to receive the flow restrictor 102 so as to place the restricting orifice of the flow restrictor 102 in-line with the passageway 110. The manifold 100 is configured such that the flow restrictor 102 receives fluid flow at a first pressure from the housing 108 along the fluid flow path, and discharges fluid flow at a second pressure to the housing 108 along the fluid flow path, the second pressure being lower than the first pressure. Thus, the flow restrictor 102 is configured to reduce a pressure of the fluid as the fluid flows through the flow restrictor along the fluid flow path. The first pressure can be referred to as a higher pressure, and the second pressure can be referred to as a lower pressure.

The manifold 100 can comprise a filter 114 disposed along the flow path. The filter 114 can be disposed between the manifold inlet 104 and the flow restrictor 102. Thus, the flow restrictor 102 can be downstream of the filter 114. The filter 114 can be configured to filter the fluid before the fluid passes along the flow path to the flow restrictor 102. The filter 114 can filter the fluid so as to prevent debris from clogging the restricting orifice of the flow restrictor 102. In one example, the housing 108 can be configured to support the filter 114. For example, the housing 108 can define a recess 116 therein that is configured to receive at least a portion of the filter 114. The housing 108 can support the filter 114 such that a filter element of the filter 114 is disposed within the flow path. For example, the housing 108 can define a recess 116 therein that is configured to receive at least a portion of the filter 114. The recess 116 can be open to, and in fluid communication with, the passageway 110 of the housing 108. The recess 116 can be configured to receive the filter 114 such that the filter element of the filter 114 is in-line with the passageway 110. In alternative examples, the filter can be supported upstream of the housing 108.

The manifold 100 can comprise a three-way ball valve 118 disposed along the fluid flow path. The three-way ball valve 118 can be disposed along the flow path between the housing 108 and the manifold outlet 106. Thus, the three-way ball valve 118 can be downstream of the housing 108 and/or the flow restrictor 102. The three-way ball valve 118 can be selectively operated in a first configuration (as shown in FIG. 3), wherein the three-way ball valve 118 communicates the fluid along the fluid flow path towards the manifold outlet 106, and a second orientation (not shown), wherein the three-way ball valve 118 diverts fluid flow from the fluid flow path to a second manifold outlet 120. In one example, the second manifold outlet 120 can lead to a drain and can be used when flushing the manifold 100.

Figure 9:
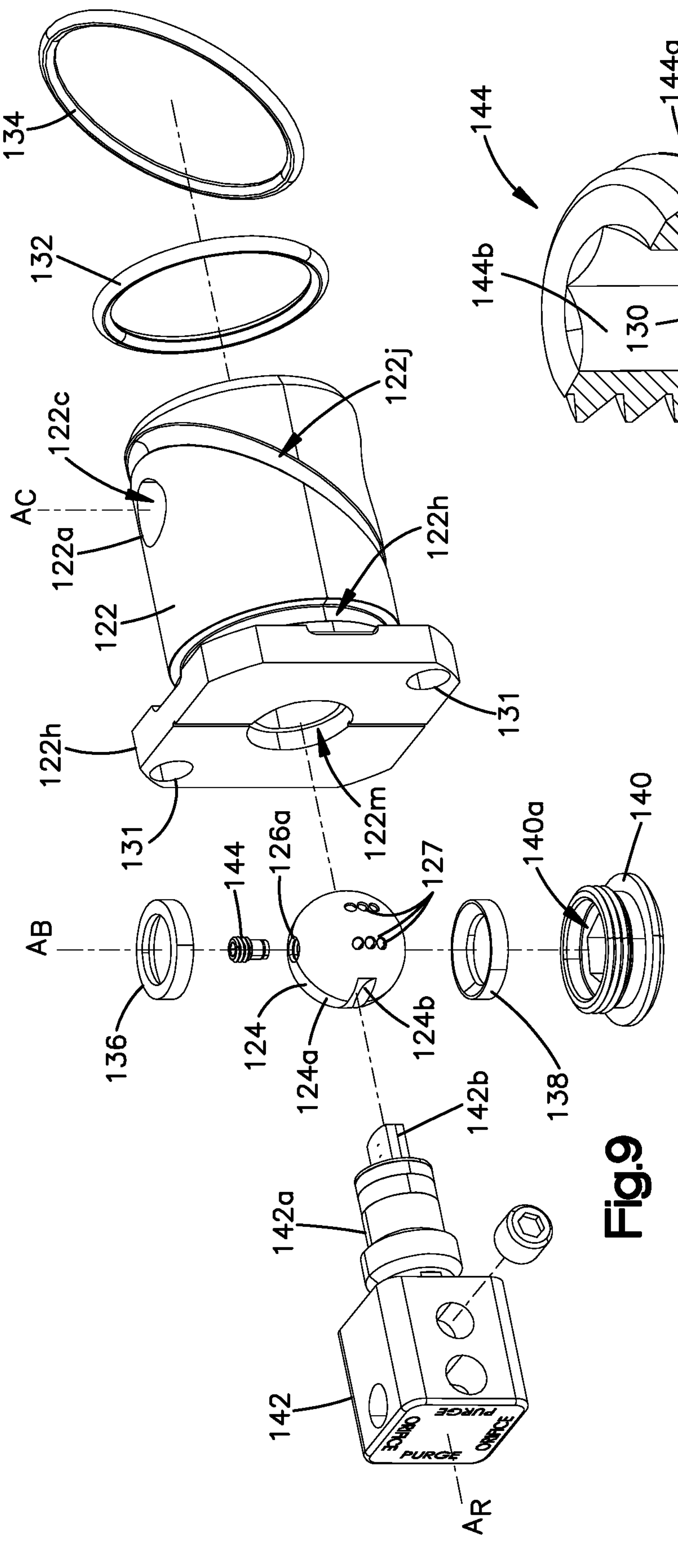
FIG. 9 shows an exploded perspective view of the flow restrictor of FIG. 4.
Figure 10:
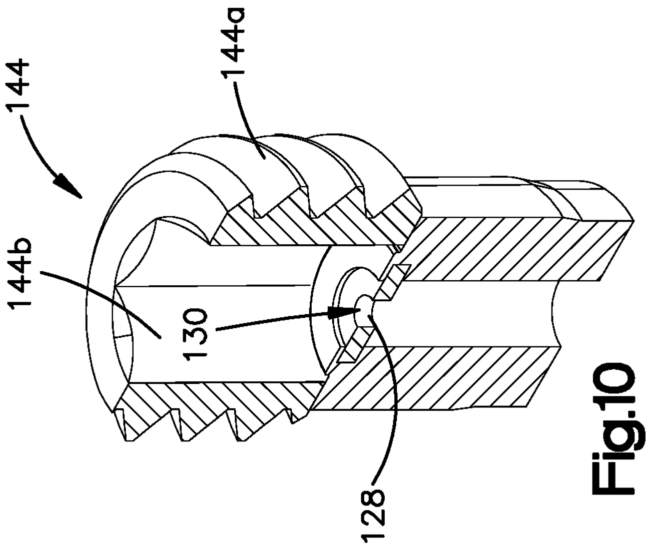
FIG. 10 shows a cross-sectional view of the orifice holder of the flow restrictor of FIG. 9 that defines the orifice of the flow restrictor.
Figure 11:
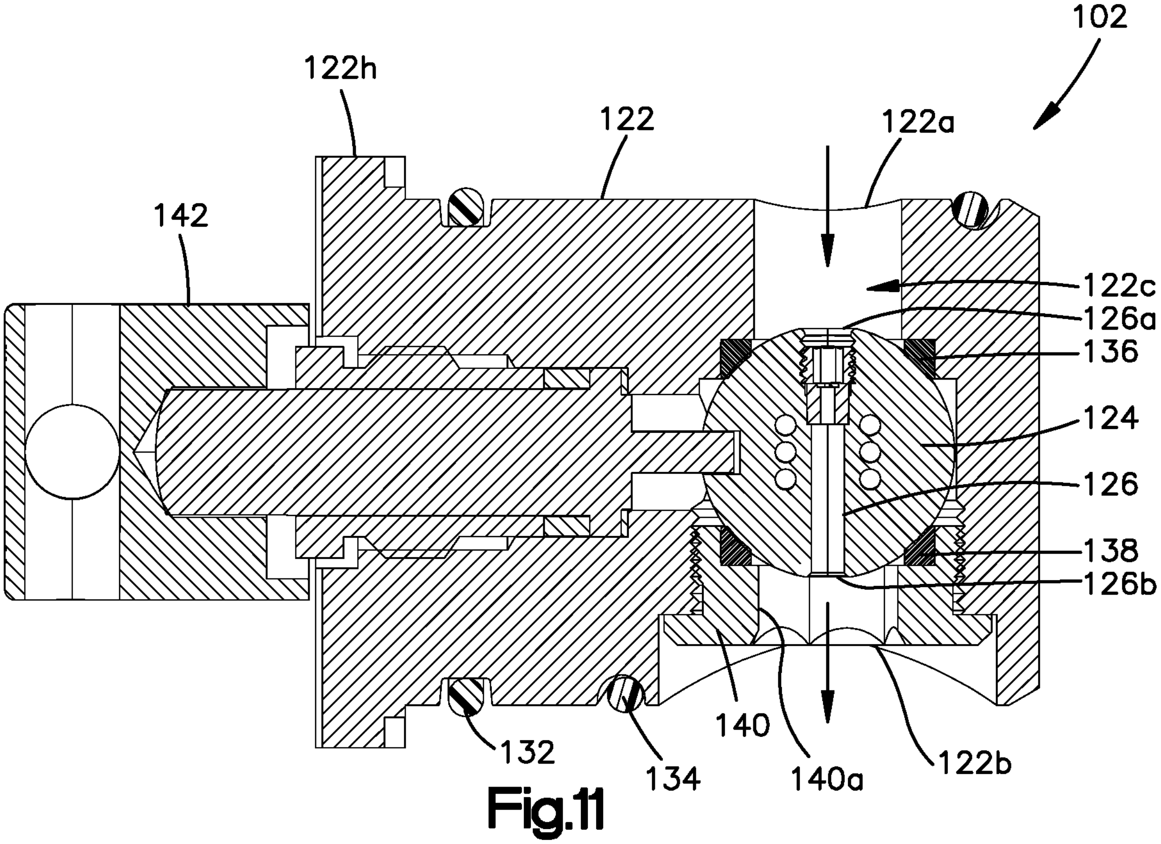
FIG. 11 shows a cross-sectional view of the fluid flow restrictor of FIG. 4 in a rotating body in a first orientation in which an outlet of the rotating body is downstream of an inlet of the rotating body.

Turning now to FIGS. 4 to 13, and with particular reference to FIGS. 9 to 11, a fluid flow restrictor 102 is shown according to one example. In general, the flow restrictor 102 comprises a housing 122. The housing 122 has a housing inlet 122*a*, a housing outlet 122*b* offset from the housing inlet 122*a* along a fluid flow direction (indicated by the arrows in FIGS. 11-13), and a housing channel 122*c* that extends between the housing inlet 122*a* and housing outlet 122*b*. In one example, the housing inlet 122*a* and the housing outlet 122*b* can be offset from one another along a central axis $A_C$. The central axis $A_C$ can be angularly offset from the axis of rotation $A_R$. For example, the central axis $A_C$ can be substantially perpendicular to the axis of rotation $A_R$.

The flow restrictor 102 comprises a rotatable body 124 disposed in the housing channel 122*c* between the housing inlet 122*a* and the housing outlet 122*b*. The rotatable body 124 has an outer surface 124*a* that is curved about an axis of rotation $A_R$. The rotatable body 124 defines a bore 126 that extends entirely through the rotatable body 124 such that the bore 126 defines a bore inlet 126*a* at the outer surface 124*a*, and a bore outlet 126*b* at the outer surface 124*a* that is offset from the bore inlet 126*a*. In one example, the bore inlet 126*a* and outlet 126*b* can be offset from one another along a central bore axis $A_B$ such that the bore inlet and outlet are aligned with one another. In such example, the central bore axis $A_B$ can be substantially parallel to the central axis $A_C$ of the housing 122 when the rotatable body is in each of the first and second orientations. In other examples (not shown), the bore inlet 126*a* and bore outlet 126*b* can be angularly offset from one another. For instance, the bore inlet 126*a* and bore outlet 126*b* can be offset from one another by an angle of 90 degrees. The rotatable body 124 is rotatable between 1) a first orientation (shown in FIG. 11) in which the bore outlet 126*b* is offset from the bore inlet 126*a* along the fluid flow direction and 2) a second orientation (shown in FIG. 12) in which the bore inlet 126*a* is offset from the bore outlet 126*b* along the fluid flow direction.

The flow restrictor 102 defines a restricting orifice 130 within the bore 126. The orifice 130 can have a cross-sectional dimension that is less than a cross-sectional dimension of the housing channel 122*c* such that the orifice 130 is configured to restrict a flow of fluid as the fluid flows between the housing inlet 122*a* and the housing outlet 122*b*. In some examples, the flow restrictor 102 can comprise an interior surface 128 (shown in FIG. 10) disposed in the bore 126 that defines a restricting orifice 130. In such examples, the restricting orifice 130 can have a cross-sectional dimension that is less than a cross-sectional dimension of the bore 126 such that the orifice 130 is configured to restrict a flow of fluid as the fluid flows between the bore inlet 126*a* and the bore outlet 126*b*. In alternative examples, the bore 126 itself can define the restricting orifice 130.

Figure 4:
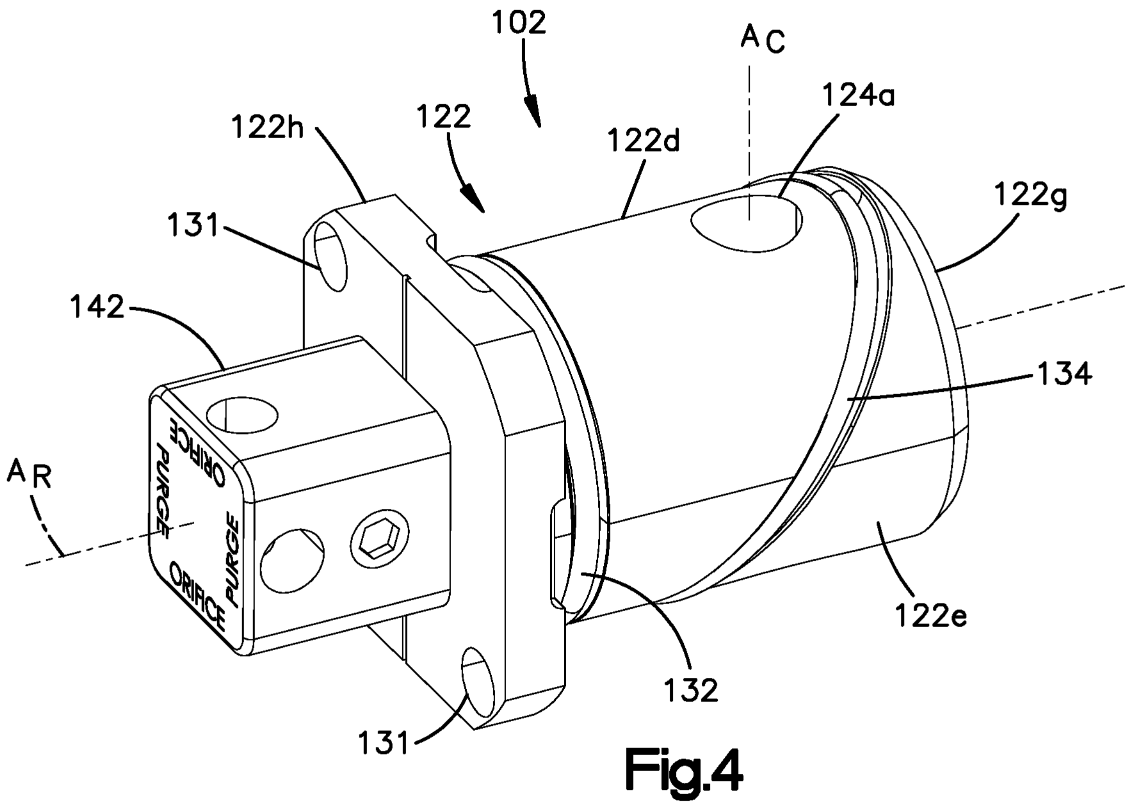
FIG. 4 shows a perspective view of a flow restrictor of the spray pressure control manifold of FIG. 1 according to one example that illustrates an inlet of the flow restrictor.
Figure 5:
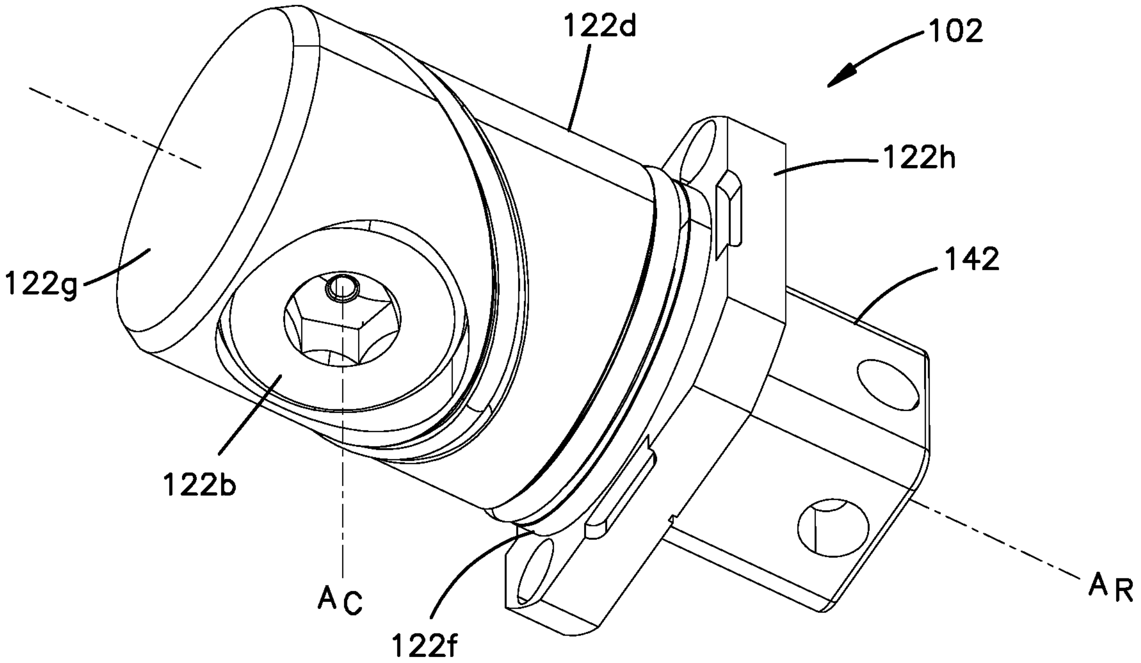
FIG. 5 shows a perspective view of the flow restrictor of FIG. 4 that illustrates an outlet of the flow restrictor.
Figure 6:
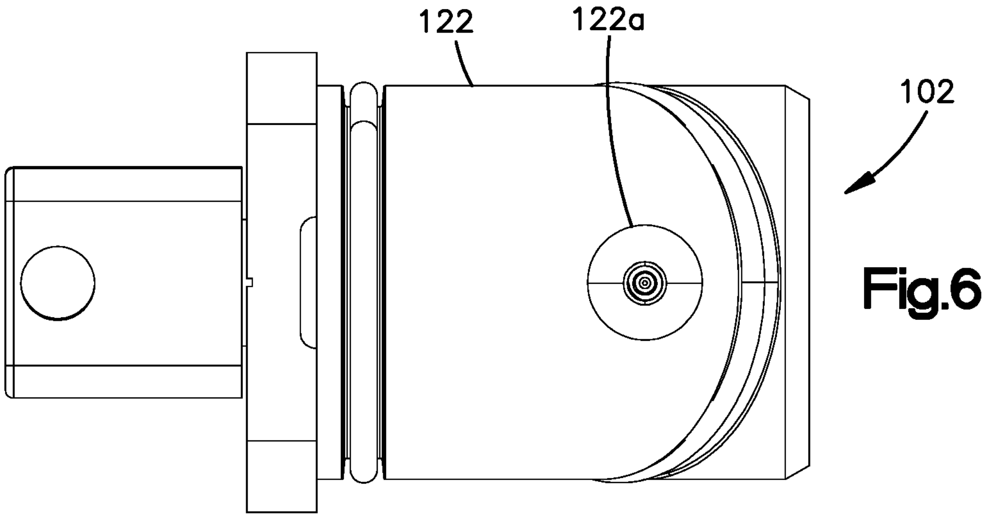
FIG. 6 shows a plan view of the flow restrictor of FIG. 4 that illustrates the inlet of the flow restrictor.
Figure 7:
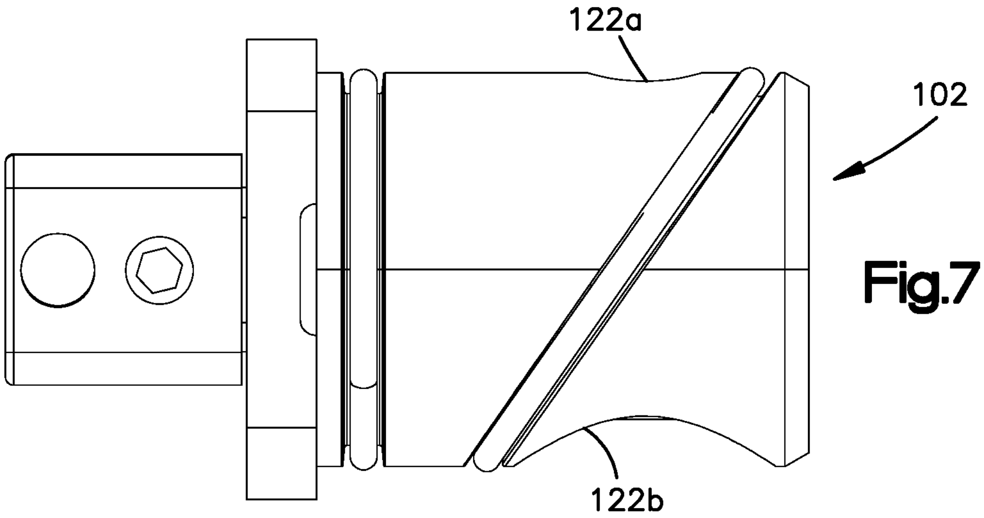
FIG. 7 shows a side plan view of the flow restrictor of FIG. 4.
Figure 8:
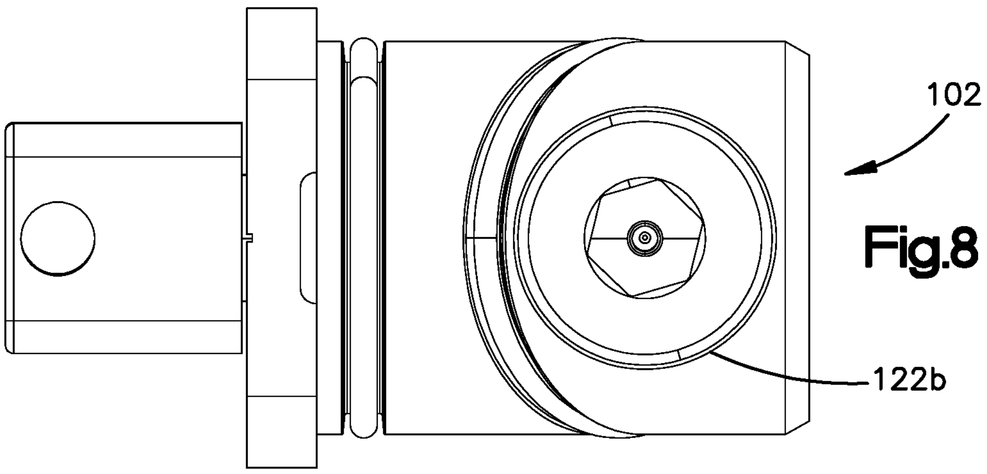
FIG. 8 shows a plan view of the flow restrictor of FIG. 4 that illustrates the outlet of the flow restrictor.

Referring more specifically to FIGS. 4 and 5, the housing 122 of the flow restrictor 102 can have a housing body 122*d*. The housing body 122*d* can have a cylindrical shape that extends along the axis of rotation $A_R$ as shown. Thus, the housing body 122*d* can have an outer surface 122*e* that is curved about the axis of rotation $A_R$, and a first end 122*f* and a second end 122*g* that are offset from one another along the axis of rotation $A_R$. The outer surface 122*e* can be shaped to conform to an inner surface of the housing 108 of FIGS. 1-3 that defines the recess 112. In other examples, the housing 122 and/or the housing body 122*d* can have any other suitable shape. In yet other examples, the housing 122 can be implemented by the housing 108 of FIGS. 1-3, such that the housing 122 and housing 108 are integral with one another.

The outer surface 122*e* can define at least one recess 122*j*, 122*k* (labeled in FIG. 9) that is configured to receive a seal 132, 134 therein. Each seal 132, 134 is configured to form a seal between the housing 122 and the inner surface of the housing 108 of FIGS. 1-3 that defines the recess 112. Each seal 132, 134 can be an O-ring, a gasket, or any other suitable seal. Each recess 122*j*, 122*k* can extend around the outer surface 122*e* of the housing body 122*d*. The at least one recess can include an angled recess 122*j* that lies in a plane that forms a non-right angle with the axis of rotation $A_R$. The angled recess 122*j* can be angled relative to the central axis $A_C$ of the housing channel 122*c* such a portion of the recess 122*j* is positioned between the housing inlet 122*a* and the second end 122*g* of the housing body 122*d* (as can be seen in FIG. 4), and a portion of the recess 122*j* is positioned between the housing outlet 122*b* and the first end 122*f* of the housing body 122*d* (as can be seen in FIG. 5). Thus, when disposed in the recess 122*j*, the seal 134 can be configured to separate the higher-pressure fluid flow at the housing inlet 122*a* from the lower-pressure fluid flow at the housing outlet 122*b*. Additionally, or alternatively, the at least one recess can include a recess 122*k* that lies in a plane that forms a right angle with the axis of rotation $A_R$. The recess 122*k* can be disposed between the housing channel 122*c* and the first end 122*f* of the housing body 122*d*. For example, the recess 122*k* can be disposed between the recess 122*j* and the first end 122*f* of the housing body 122*d*. When disposed in the recess 122*k*, the seal 132 can be configured to seal the first end 122*f* of the housing body 122*d* so as to prevent leakage of fluid past the first end 122*f* along a direction that extends from the second end 122*g* towards the first end 122*f*.

Referring to FIGS. 9 and 11, the housing 122 can define a cross-channel 122*m* that extends into the housing 122 along the axis of rotation $A_R$. The cross-channel 122*m* can be open to the housing channel 122*c*. The flow restrictor 102 can comprise a handle 142 that is configured to transition the rotatable body 124 between 1) the first orientation (shown in FIG. 11) in which the bore outlet 126*b* is offset from the bore inlet 126*a* along the fluid flow direction and 2) the second orientation (shown in FIG. 12) in which the bore inlet 126*a* is offset from the bore outlet 126*b* along the fluid flow direction. The cross-channel 122*m* can be configured to receive at least a portion of the handle 142 such that the handle 142 is coupled to the rotatable body 124 when the rotatable body 124 is received in the housing channel 122*c*.

The housing channel 122*c* can include an upstream portion, a downstream portion, and an intermediate portion between the upstream portion and the downstream portion. The upstream portion can extend from the housing inlet 122*a* towards the intermediate portion. The downstream portion can extend from the housing outlet 122*b* towards the intermediate portion. The intermediate portion can be sized to receive the rotatable body 124 therein. At least one of the upstream portion and downstream portion of the housing channel 122*c* can have a cross-sectional dimension that is less than a cross-sectional dimension of the rotatable body 124. Additionally, or alternatively, at least one of the upstream portion and downstream portion of the housing channel 122*c* can have a cross-sectional dimension that is greater than a cross-sectional dimension of the rotatable body 124 such that the rotatable body 124 can be received into the intermediate portion of the housing channel 122*c* through the at least one of the upstream portion and downstream portion. FIG. 11 shows an example where the downstream portion has a greater cross-sectional dimension; however, it will be understood that the upstream portion could additionally, or alternatively, have the greater cross-sectional dimension.

The at least one of upstream portion and the downstream portion can be configured to receive a plug 140 that is configured to retain the rotatable body 124 in the housing channel 122*c*. In one example, the plug 140 can define external threading that is configured to engage internal threading of the housing channel 122*c*. In other examples, the plug 140 can be secured to the housing body 122 using another suitable fastener other than threading. The plug 140 can define plug channel 140*a* therethrough that has a cross-sectional dimension that is less than the cross-sectional dimension of the rotatable body 124. Optionally, at least a portion of the plug channel 140*a* can be defined by a drive surface that is configured to be engaged by a drive instrument such as a screw driver to rotate the plug 140 to engage or disengage the plug 140 with the housing body 122. The drive surface can have a non-circular cross-sectional shape, such as (without limitation) a hexagonal shape, a star shape, a plus shape, or other suitable shape.

The flow restrictor 102 can include at least one seat 136, 138 that is configured to receive a portion of the rotatable body 124 such that the rotatable body 124 rotates within the seat 136, 138. Each seat can have a ring shape. Each seat 136, 138 can have an inner engagement surface that is configured to engage the rotatable body 124. The inner engagement surface can conform to the outer surface 124*a* of the rotatable body 124 so as to form a seal with the rotatable body 124. In one example, the inner engagement surface can have a partially-spherical shape as shown. In another example, the inner engagement surface can have a partially-cylindrical shape. The at least one seat can include a seat 136 adjacent to the upstream portion of the housing channel 122*c*. Additionally, or alternatively, the at least one seat can include a seat 138 adjacent the downstream portion of the housing channel 122*c*.

The housing 122 can include a flange **122*h* attached to the first end 122*f* of the housing body 122*d*. The flange 122*h* can extend outwards from the housing body 122*d* along a radial direction that is perpendicular to the axis of rotation $A_R$. Thus, the flange 122*h* can have a cross-sectional dimension along the radial direction that is greater than a cross-sectional dimension of the housing body 122 along the radial direction. The cross-sectional dimension of the flange 122*h* can similarly be greater than a cross-sectional dimension of the recess 112 of the housing 108 of FIGS. 1-3 along the radial direction. As such, the flange 122*h* can define a stop that limits an insertion depth of the housing 122 into the recess 112. The flange 122*h* can define one or more fasteners 131 that are configured to support coupling of the flange 122*h* to the housing 108. For example, one or more of fasteners 131 can define an aperture that is configured to receive a screw or bolt therethrough so as to couple the flange 122*h*, and consequently, the housing 122, to the housing 108. In other examples, each fastener 131 can be a fastener other than an aperture, such as (without limitation) a projection that is received in a recess of the housing 108**.

With reference to FIGS. 9 and 10, the rotatable body 124 has an outer surface **124*a* that can have a substantially spherical shape as shown or can have another suitable shape such as a cylindrical shape having a central axis that extends along the axis of rotation $A_R$. As discussed above, the rotatable body 124 defines a bore 126 that extends entirely through the rotatable body 124 such that the bore 126 defines a bore inlet 126*a* at the outer surface 124*a*, and a bore outlet 126*b* at the outer surface 124*a* that is offset from the bore inlet 126*a*. The flow restrictor 102 comprises an interior surface 128 (shown in FIG. 10) disposed in the bore 126. The interior surface 128 defines an orifice 130 having a cross-sectional dimension that is less than a cross-sectional dimension of the housing channel 122*c* such that the orifice 130 is configured to restrict a flow of fluid as the fluid flows between the housing inlet 122*a* and the housing outlet 122*b*. In one example, the orifice 130 can have a cross-sectional dimension that is less than a cross-sectional dimension of the bore 126 as shown such that the orifice 130 is configured to restrict a flow of fluid as the fluid flows between the bore inlet 126*a* and the bore outlet 126*b*. In another example, the orifice 130 can have a cross-sectional dimension that is equal to a cross-sectional dimension of the bore 126. In one example, the orifice 130** can have a cross-sectional dimension between about 0.005 inches and 0.05 inches, including 0.001 increments therebetween.

In one example, as shown in FIGS. 9 and 10, the flow restrictor 102 can comprise a holder 144 that comprises the interior surface 128 that defines the orifice 130. The holder 144 can have a tubular shape or other suitable shape. The holder 144 can be configured to be supported in the bore 126 of the rotatable body 124. The holder 144 can be configured to removably couple to the rotatable body 124. For example, the holder 144 can have a fastener **144*a* that is configured to fasten the holder 144 to the rotatable body 124. In one example, the fastener 144*a* can included threading that is configured to engage threading of the rotatable body 124. The threading can be external threading that is configured to engage internal threading defined in the bore 126 of the rotatable body. In other examples, the fastener 144*a* can be another suitable fastener other than threading. Further, in other examples, the flow restrictor 102 can be devoid of the removable holder 144, and the interior surface 128 can be fixedly attached within the bore 126 of the rotatable body 124 such that the interior surface 128 is not removable from the rotatable body 124**.

The holder 144 can have a drive surface **144*b* that is configured to be engaged by a drive instrument such as a screw driver to rotate the holder 144 to engage or disengage the holder 144 with the rotatable body 124. The drive surface 144*b* can have a non-circular cross-sectional shape, such as (without limitation) a hexagonal shape, a star shape, a plus shape, or other suitable shape, that is configured to be engaged by the driver. The holder 144 can be configured to be removably coupled to the rotatable body 124 through the housing inlet 122*a* of the housing 122, without disassembling the rotatable body 124 from the flow restrictor 102. For example, the holder 144 can have an outer cross-sectional dimension that is less than a cross-sectional dimension of the housing inlet 122*a*, such that the holder 144 can be inserted into and removed through the housing inlet 122*a*. The holder 144 can be configured to be supported within the bore 126 of the rotating body adjacent to the inlet 126*a***.

The orifice 130 is configured to receive fluid flow at a first pressure from the housing inlet **122*a* along the fluid flow path, and discharge fluid flow at a second pressure to the housing outlet 122*b* along the fluid flow path, the second pressure being lower than the first pressure. Thus, the orifice 130 is configured to reduce a pressure of the fluid as the fluid flows through the flow restrictor 102 along the fluid flow path. The amount that the pressure is reduced depends at least in part on the size of the orifice 130. Generally, smaller orifices 130 will cause greater pressure reductions than larger orifices 130. In other words, smaller orifices 130 will generally cause the pressure the housing outlet 122*b* to be less than that caused by larger orifices 123. By implementing the holder 144 to be removable, a desired pressure reduction can be selected by selecting from a plurality of holders 144, each having a differently-sized orifice 130. Thus, in one example, the present invention can include a kit or system that comprises the flow restrictor 102 and a plurality of holders 144, each having a differently-sized orifice 130**.

Figure 12:
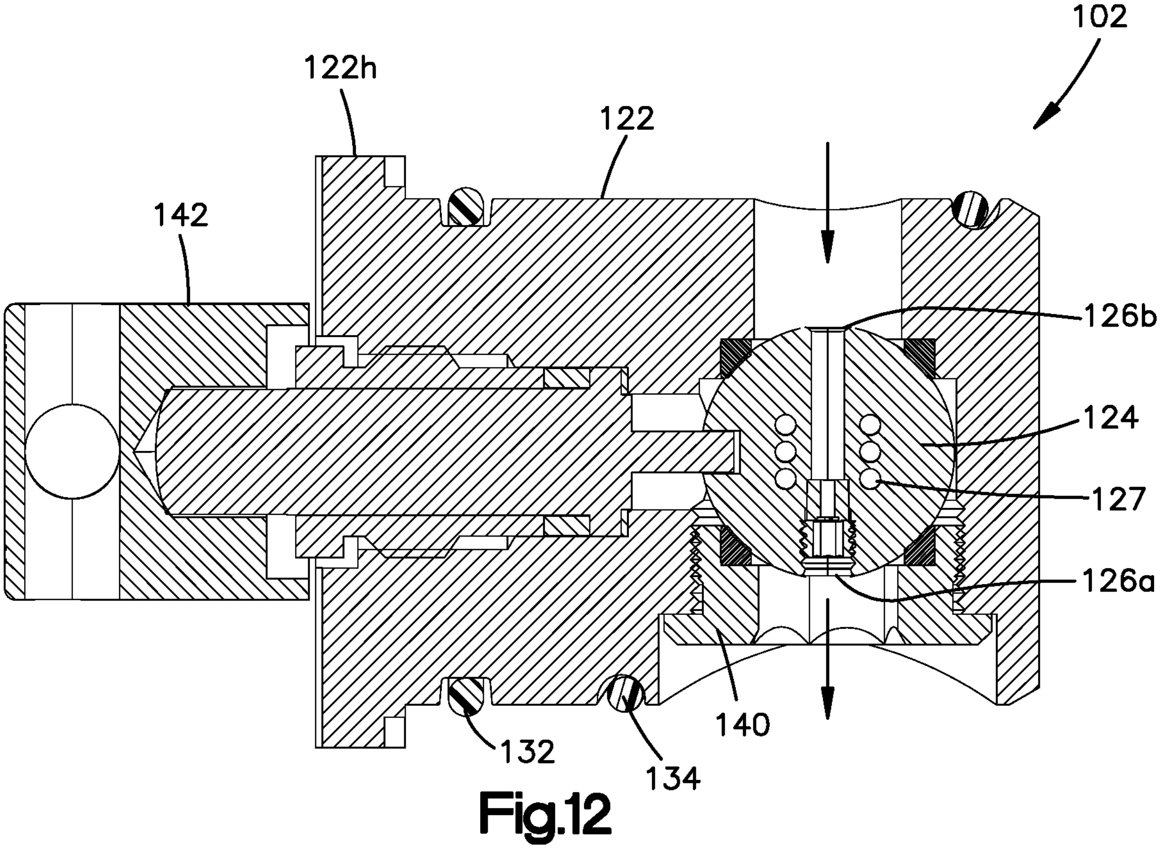
FIG. 12 shows a cross-sectional view of the fluid flow restrictor of FIG. 4 in a rotating body in a second orientation in which an inlet of the rotating body is downstream of an outlet of the rotating body.

Referring to FIGS. 9, 11, and 12, the flow restrictor 102 can comprise a handle 142 that attaches to the rotatable body 124 such that the handle 142 and rotatable body 124 are rotationally fixed to one another with respect to rotation about the axis of rotation $A_R$. The handle 142 can include a shaft **142*a* that is configured to be received in the cross-channel 122*m* that extends into the housing 122. The handle 142 can include a coupler 142*b* that is configured to engage a coupler 124*b* of the rotatable body 124. The coupler 142*b* be any suitable coupler that rotationally fixes to the coupler 124*b* of the rotatable body 124. In one example, the coupler 142*b* can include an outer surface having a non-circular cross-section, and the coupler 124*b* can be a recess having a non-circular cross-section that conforms to the outer surface of the coupler 142*b* such that rotation of the handle 142 causes a corresponding rotation of the rotatable body 124. It will be understood that the couplers 142*b* and 124*b* can be configured in another suitable manner. In other examples, the handle 142 can be fixedly attached to the rotatable body 124**.

The rotatable body 124 can be transitioned between a first orientation (shown in FIG. 11) and a second orientation (shown in FIG. 12). In the first orientation, the orifice 130 is oriented to so as to restrict a flow of fluid through the flow restrictor 102. Further, in the first orientation, the bore outlet **126*b* is offset from the bore inlet 126*a* along the fluid flow direction. In the second orientation, the orifice 130 is oriented so as to flush clogs that arise when the flow restrictor 102 is in the first orientation. In the second orientation, the bore inlet 126*a* is offset from the bore outlet 126*b* along the fluid flow direction. For example, in the second orientation, the orifice 130 can be rotated by 180 degrees about the axis of rotation $A_R$ relative a position of the orifice 130 in the first orientation. The rotatable body 124 can be transitioned between the first and second orientations by rotating the handle 142, which causes a corresponding rotation of the rotatable body 124. In one example, the rotatable body 124 can be transitioned between the first and second orientations by rotating the handle 142, and consequently the rotatable body 124, by 180 degrees about the axis of rotation $A_R$. In other examples (not shown), the rotatable body 124 can be transitioned between the first and second orientations by rotating the handle 142, and consequently the rotatable body 124, by an angle other than 180 degrees. In some examples, such as the example shown, the flow restrictor 102 can restrict the fluid flow when the rotatable body 124 is in both the first orientation and the second orientation. The flow restrictor 102 can be operated in one of the first and second orientations so as to restrict a flow of fluid, and can subsequently be transitioned to another of the first and second orientations so as to flush the orifice 130**.

Figure 13:
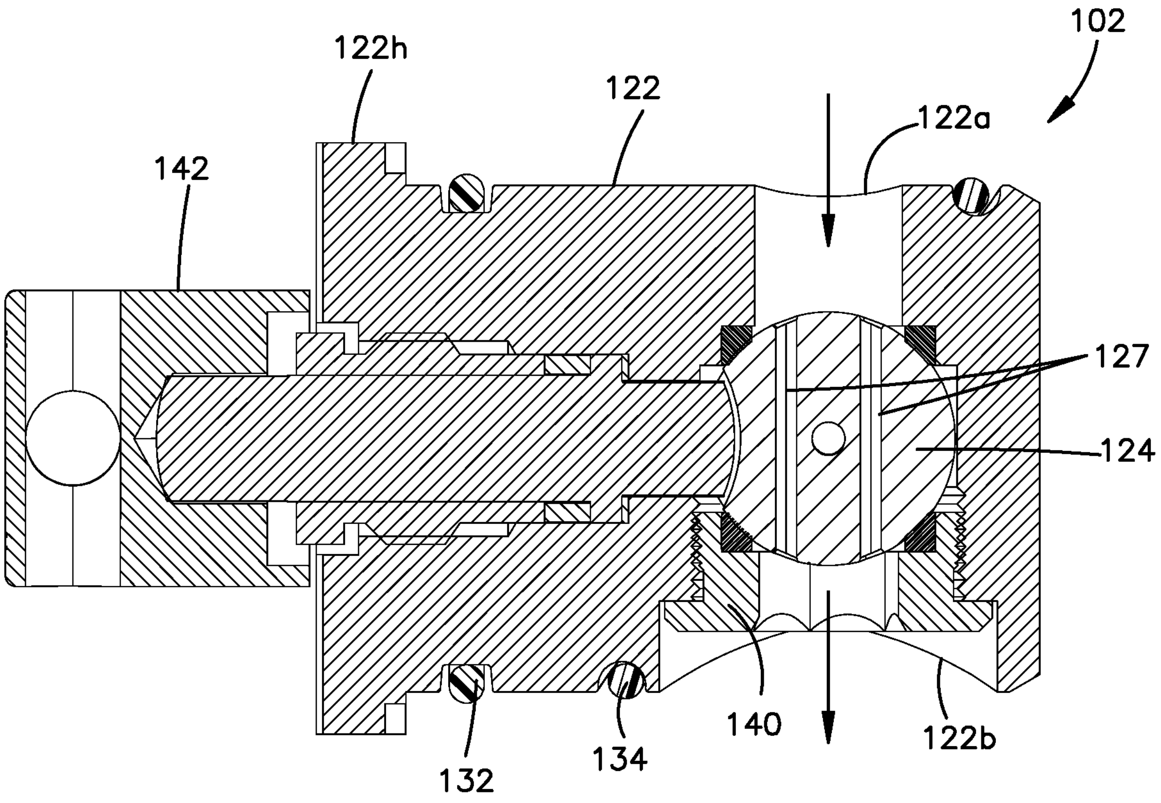
FIG. 13 shows a cross-sectional view of the fluid flow restrictor of FIG. 4 in a rotating body in a third orientation in which an orifice of the fluid flow restrictor is bypassed.
Figure 15:
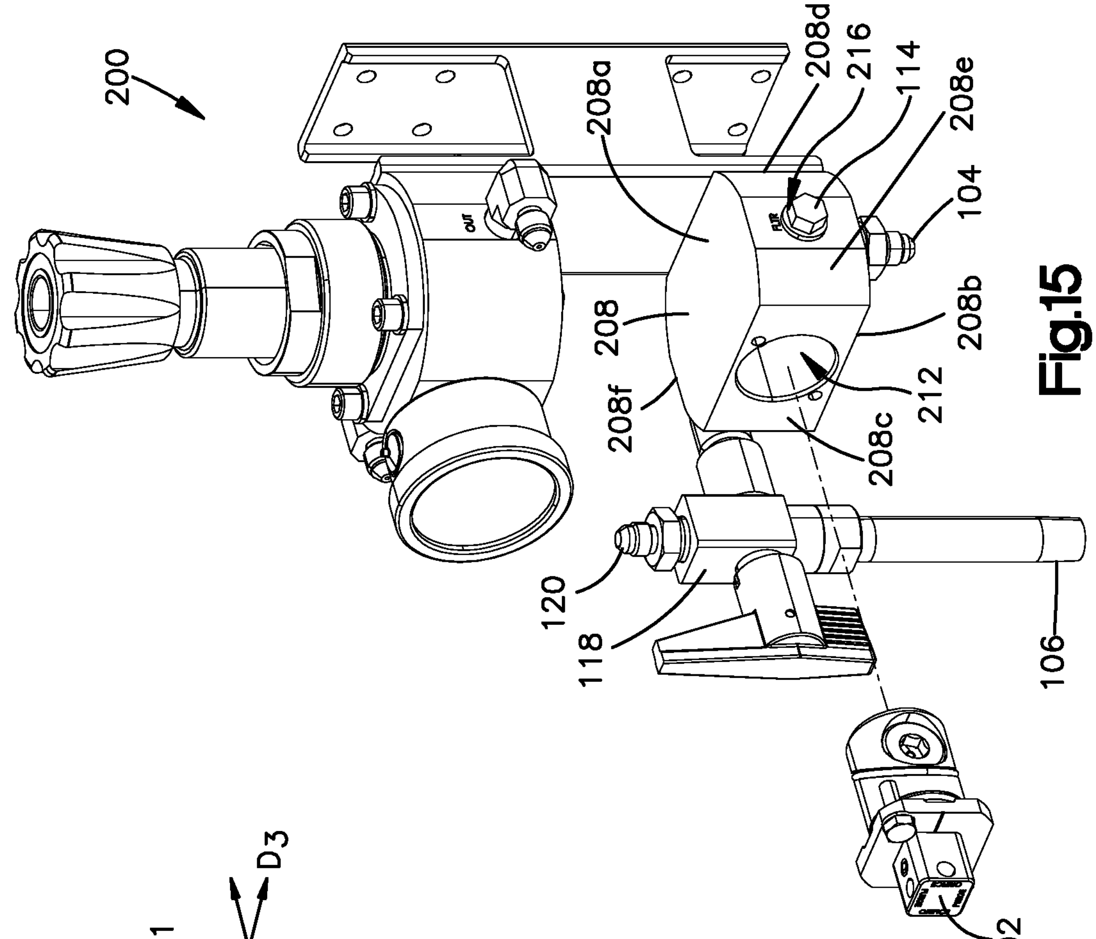
FIG. 15 shows a partially exploded perspective view of the spray pressure control manifold of FIG. 14.
Figure 14:
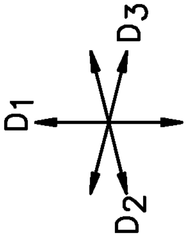
FIG. 14 shows a perspective view of a spray pressure control manifold according to another example.
Figure 14:
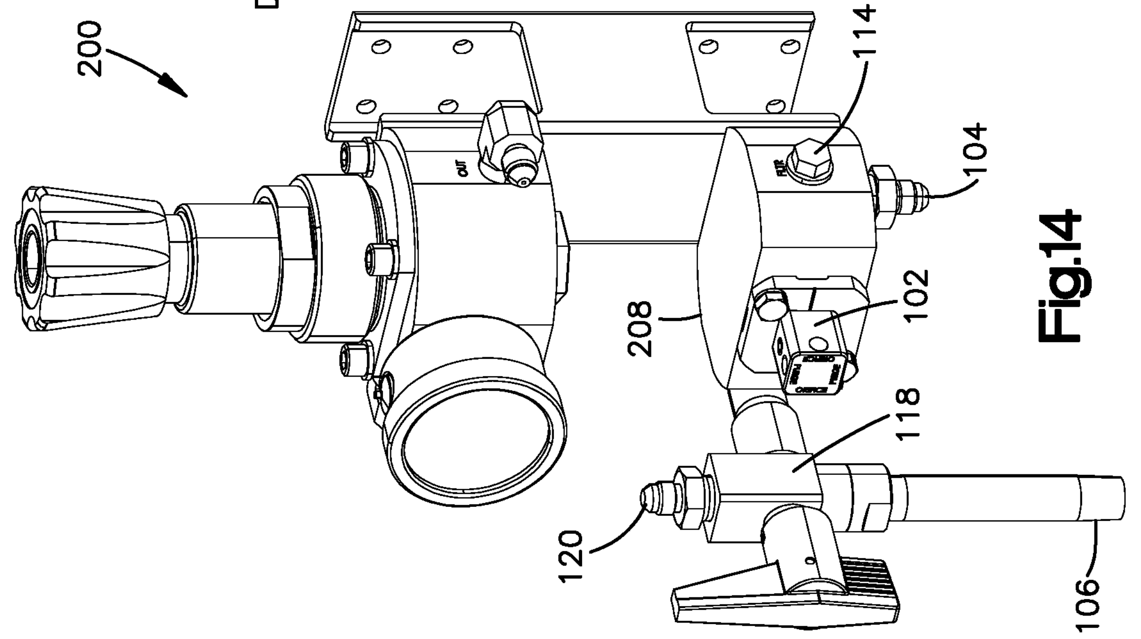
Figure 16:
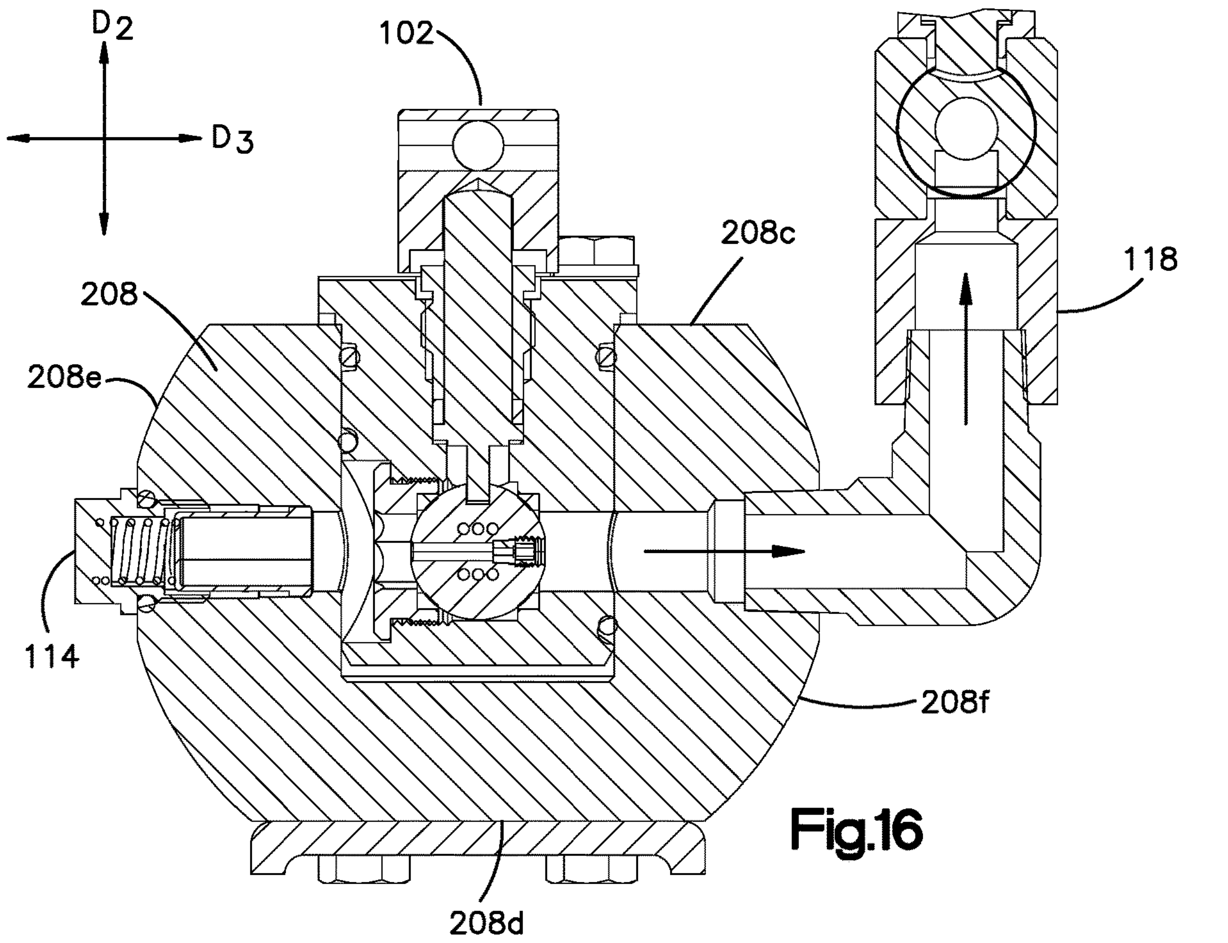
FIG. 16 shows a cross-sectional view of the spray pressure control manifold of FIG. 14.
Figure 17:
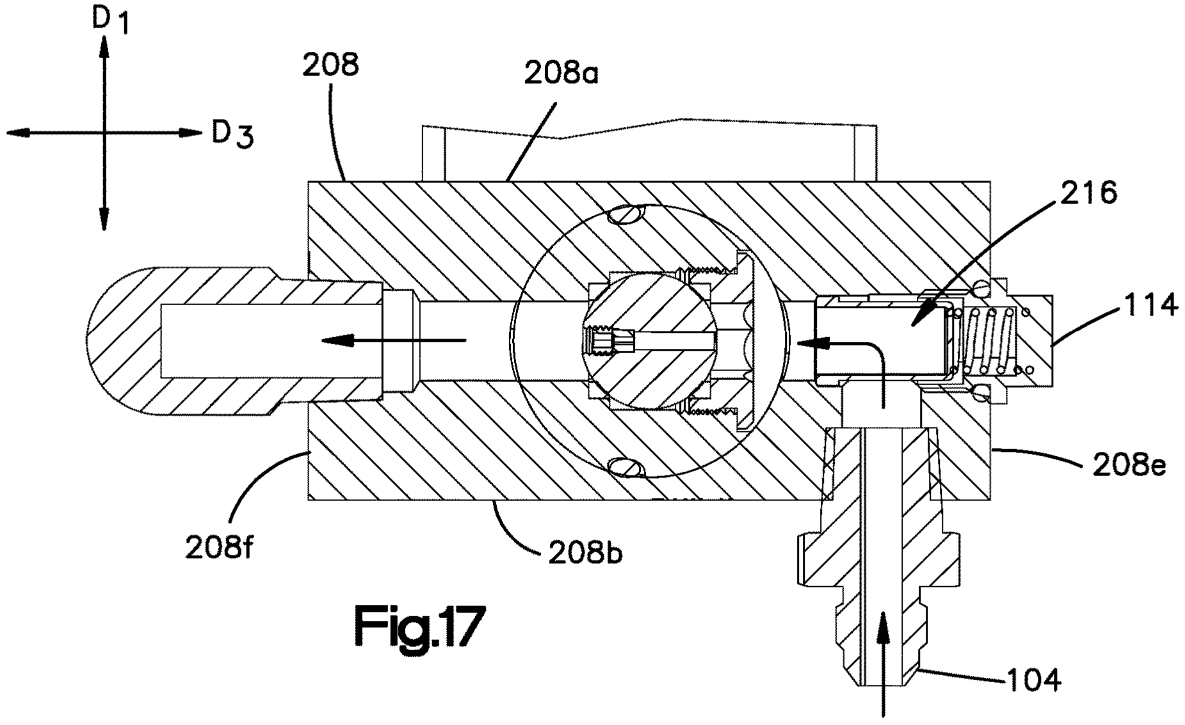
FIG. 17 shows another cross-sectional view of the spray pressure control manifold of FIG. 14.

Turning now to FIGS. 9 and 13, the rotatable body 124 can optionally define at least one bypass bore 127, such as a plurality of bypass bores 127, that extends through the rotatable body 124. Each bypass bore 127 can be angularly offset from the bore 126. In one example, each bypass bore 127 can extend along a central axis that extends along a direction that is perpendicular to the central axis of the bore 126. Each bypass bore 127 can be offset from the bore 126 so as to not be in fluid communication with the bore 126. As shown in FIG. 13, the rotatable body 124, and hence the flow restrictor 102, can be configured to be operated in a third orientation in which the flow restrictor 102 is configured such that fluid flows through the at least one bypass bore 127, without flowing through the bore 126. Thus, in the third orientation, the at least one bypass bore 127 is arranged in-line with the fluid flow from the housing inlet **122*a* to the housing outlet 122*b* such that the at least one bypass bore 127 is in fluid communication with the housing inlet 122*a* and the housing outlet 122*b*. The rotatable body 124 can be transitioned between (1) the first or second orientations and (2) the third orientation by rotating the handle 142, which causes a corresponding rotation of the rotatable body 124. In one example, the rotatable body 124 can be transitioned between (1) the first or second orientations and (2) the third orientation by rotating the handle 142, and consequently the rotatable body 124, by 90 degrees about the axis of rotation $A_R$. In other examples (not shown), the rotatable body 124 can be transitioned between (1) the first or second orientations and (2) the third orientation by rotating the handle 142, and consequently the rotatable body 124, by an angle other than 90 degrees. The third orientation may be employed, for example, in instances when it is desired to flush the housing 108 or flow restrictor 102, without flushing the orifice 130**.

Although not shown, the rotatable body 124, and hence the flow restrictor 102, can be configured to be operated in a fourth orientation in which the flow restrictor 102 is configured such that fluid flows through the at least one bypass bore 127, without flowing through the bore 126. In the fourth orientation, the at least one bypass bore 127 is arranged in-line with the fluid flow from the housing inlet **122*a* to the housing outlet 122*b* such that the at least one bypass bore 127 is in fluid communication with the housing inlet 122*a* and the housing outlet 122*b*. The rotatable body 124 can be transitioned between (1) the first, second, or third orientation and (2) the fourth orientation by rotating the handle 142, which causes a corresponding rotation of the rotatable body 124. In the fourth orientation, the rotatable body 124 can be orientated 180 degrees about the axis of rotation $A_R$ relative to third orientation. The fourth orientation may be employed, for example, in instances when it is desired to flush the housing 108 or flow restrictor 102, without flushing the orifice 130**.

Referring back to FIGS. 1 to 3, the housing 108 can have any suitable shape. For example, the housing 108 can have a first end **108*a* and a second end 108*b* that are offset from one another along a first direction $D_1$. The housing 108 can have a first side 108*c* and a second side 108*d* that are offset from one another along a second direction $D_2$, perpendicular to the first direction $D_1$. The first side 108*c* and the second side 108*d* can extend between the first and second ends 108*a* and 108*b*. The flow path can be defined from the first end 108*a* to the second end 108*b*. The recess 112 that is configured to receive the flow restrictor 102 can extend into the first side 108*c* towards the second side 108*d*. Additionally, or alternatively, the recess 116 that is configured to receive filter 114 can extend into the first side 108*c* towards the second side 108*d***.

FIGS. 14 to 17 show another example of a spray pressure control manifold 200 in which the manifold housing 208 is configured in an alternative manner such that the flow path through the manifold housing is different from the flow path through the manifold housing 108 of FIGS. 1 to 3. In FIGS. 14 to 17, identical features to those discussed above in relation to FIGS. 1 to 13 are identified with like reference numerals. The spray pressure control manifold 200 can optionally comprise a regulator 202 and a bracket 204. The regulator 202 and housing 208 can be mounted to the bracket 204. The housing 208 can have a first end **208*a* and a second end 208*b* that are offset from one another along a first direction $D_1$. The housing 208 can have a first side 208*c* and a second side 208*d* that are offset from one another along a second direction $D_2$, perpendicular to the first direction $D_1$. The first and second sides 208*c* and 208*d* can extend between the first and second ends 208*a* and 208*b*. The housing 208 can have a third side 208*e* and a fourth side 208*f* that are offset from one another along a third direction $D_3$, perpendicular to the first and second directions $D_1$ and $D_2$. The third and fourth sides 208*e* and 208*f* can extend between the first and second ends 208*a* and 208*b*. The flow path can be defined from the second end 208*b* to the fourth side 208*f*. The recess 212 that is configured to receive the flow restrictor 102 can extend into the first side 208*c* towards the second side 208*d*. Additionally, or alternatively, the recess 216 that is configured to receive filter 114 can extend into the third side 208*e* towards the fourth side 208*f***.

Figure 18:
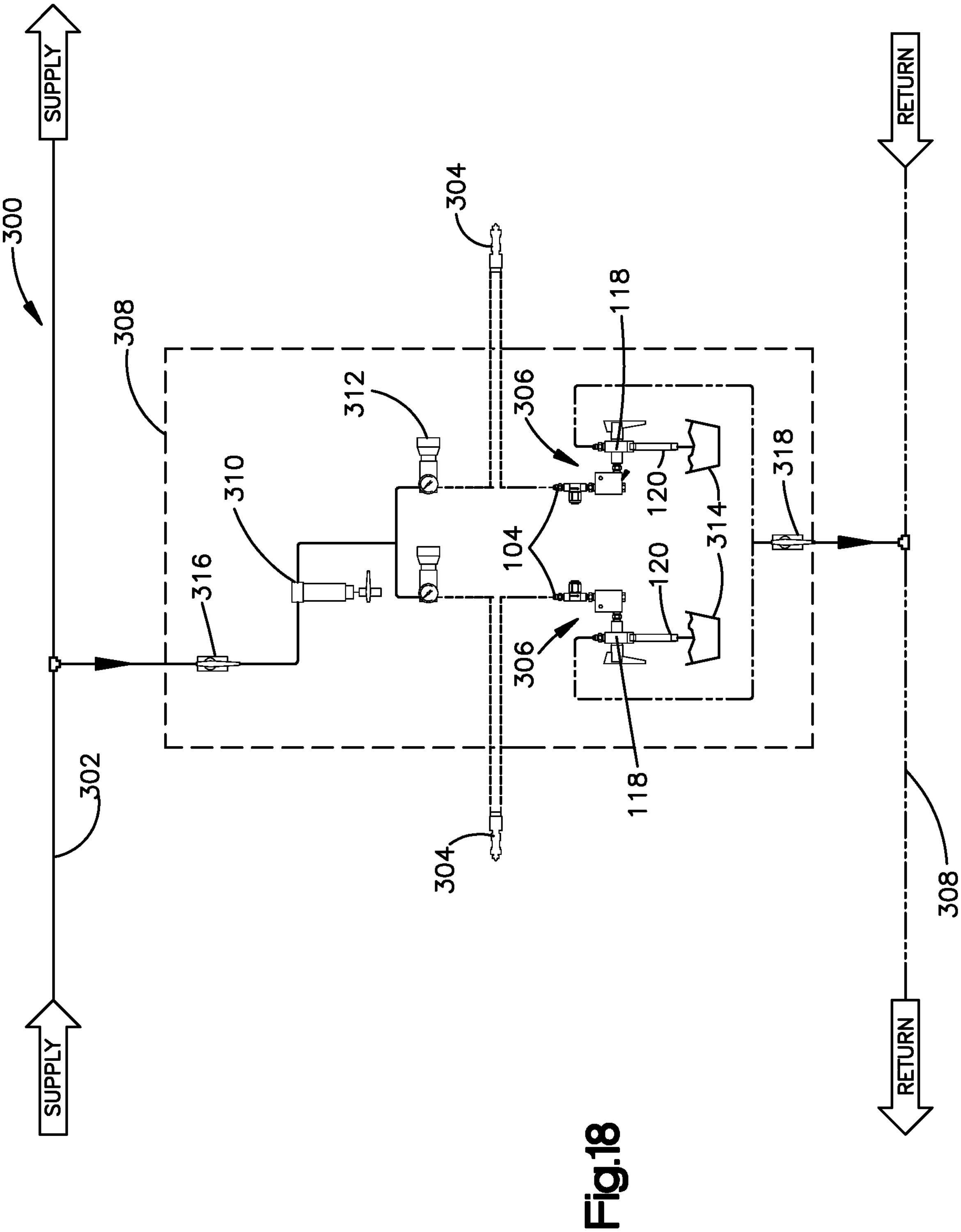
FIG. 18 shows a simplified schematic diagram a spray system according to one example that comprises a spray pressure control manifold.

Turning to FIG. 18, a simplified schematic diagram is shown of a spray system 300 according to one example. The spray system 300 comprises a supply line 302 that is configured to provide a fluid to at least one spray gun 304 that is configured to discharge the fluid as a spray. The fluid can be supplied to the supply line 302 by a pump (not shown). The spray system 300 comprises at least one spray pressure control manifold 306 that is configured to receive fluid from the spray gun 304 that is not discharged by the spray gun 304. The at least one spray pressure control manifold 306 can be implemented as discussed above in relation to manifolds 100 and 200. The fluid is received by the at least one spray pressure control manifold 306 at a first pressure. In one example, the first pressure can be between approximately 800 and 1100 psi, although other pressures are contemplated. In one example, the at least one spray gun 304 can be configured to discharge the spray at a pressure between approximately 400 and 800 psi, although other pressures are contemplated. The spray system 300 comprises a return line 308 that is configured to return fluid received from the at least one manifold 306 at a second pressure to the pump, where the second pressure is less than the first pressure. In one example, the second pressure can be less than approximately 50 psi, although other pressures are contemplated.

In FIG. 18, the supply line 302 is shown providing a fluid to a pair of spray guns 304, each of which provides excess fluid to a corresponding manifold 306. However, it will be understood that supply line 302 can provide fluid to only a single spray gun 304, or to additional spray guns (not shown) downstream of the pair of spray guns 304 as indicated by the right-most supply arrow and the right-most return arrow. In examples that employ a pair of spray guns 304, the pair can be mounted to a common panel 308.

The system 300 can optionally comprise a filter 310 that is configured to filter the fluid provided to the at least one spray gun 304. The filter 310 can be positioned upstream of the at least one spray gun 304. For example, the filter can be disposed in the fluid path between the supply line 302 and the at least one spray gun 304. The system 300 can optionally comprise a pressure regulator 312 that is configured to regulate a pressure of the fluid provided to the at least one spray gun 304. The pressure regulator 312 can be positioned upstream of the at least one spray gun 304. For example, the pressure regulator 312 can be disposed in the fluid path between the supply line 302 and the at least one spray gun 304. The system 300 can optionally comprise at least one drain 314 disposed adjacent to the second manifold outlet 120 of each manifold 306. Each drain 314 can be configured to receive fluid from a corresponding manifold 306 when the manifold 306 is being flushed. The system 300 can optionally include at least one valve 316 that is configured to isolate the at least one spray gun 304 from the supply line 302. Additionally, or alternatively, the system 300 can include at least one valve 318 that is configured to isolate the at least one spray gun 304 from the return line 308.

Figure 20:
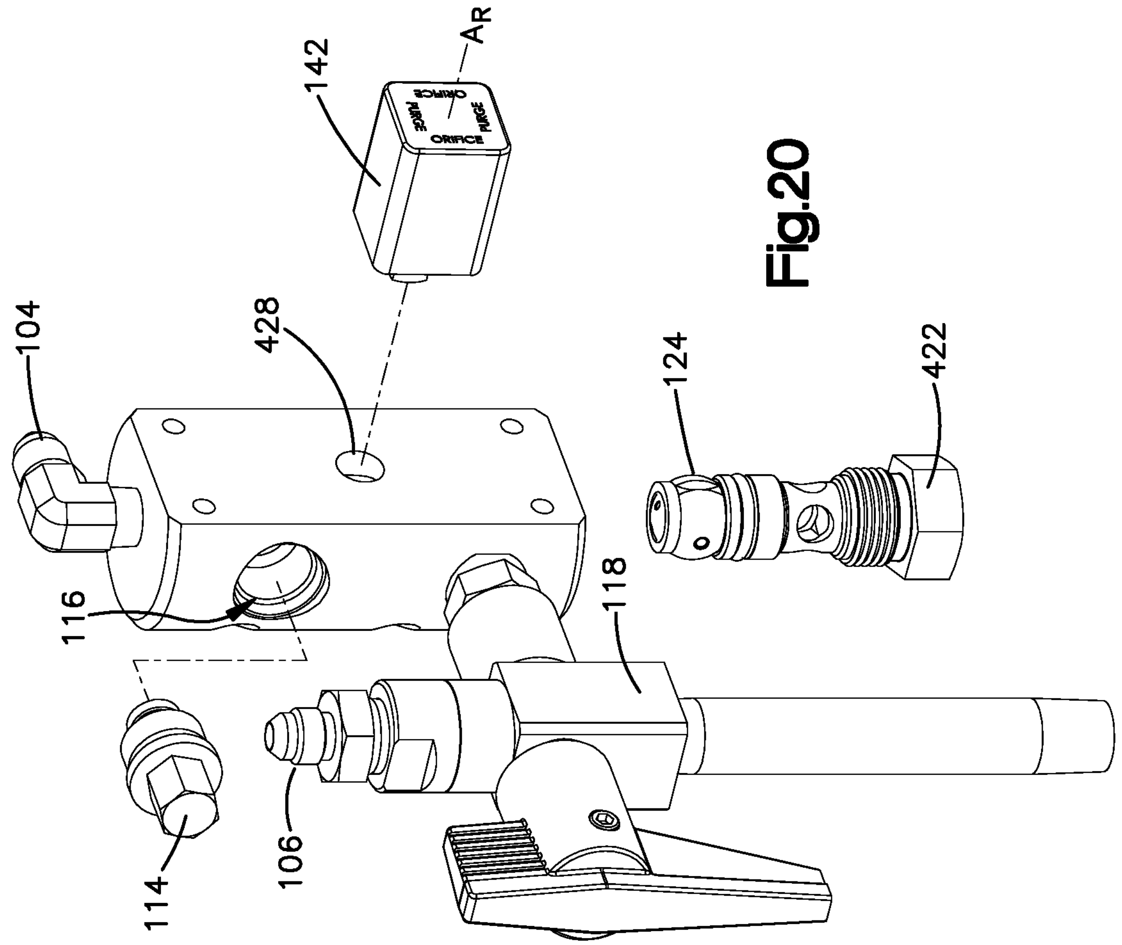
FIG. 20 shows a partially exploded perspective view of the spray pressure control manifold of FIG. 19.
Figure 19:
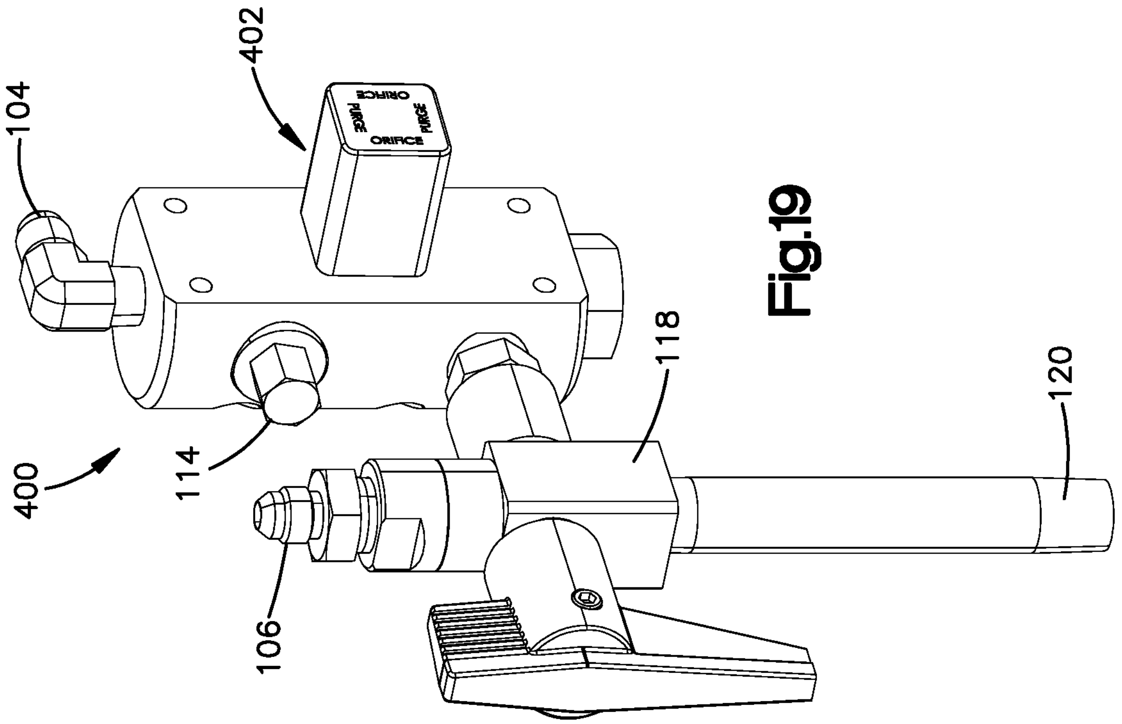
FIG. 19 shows a perspective view of a spray pressure control manifold according to yet another example.
Figure 21:
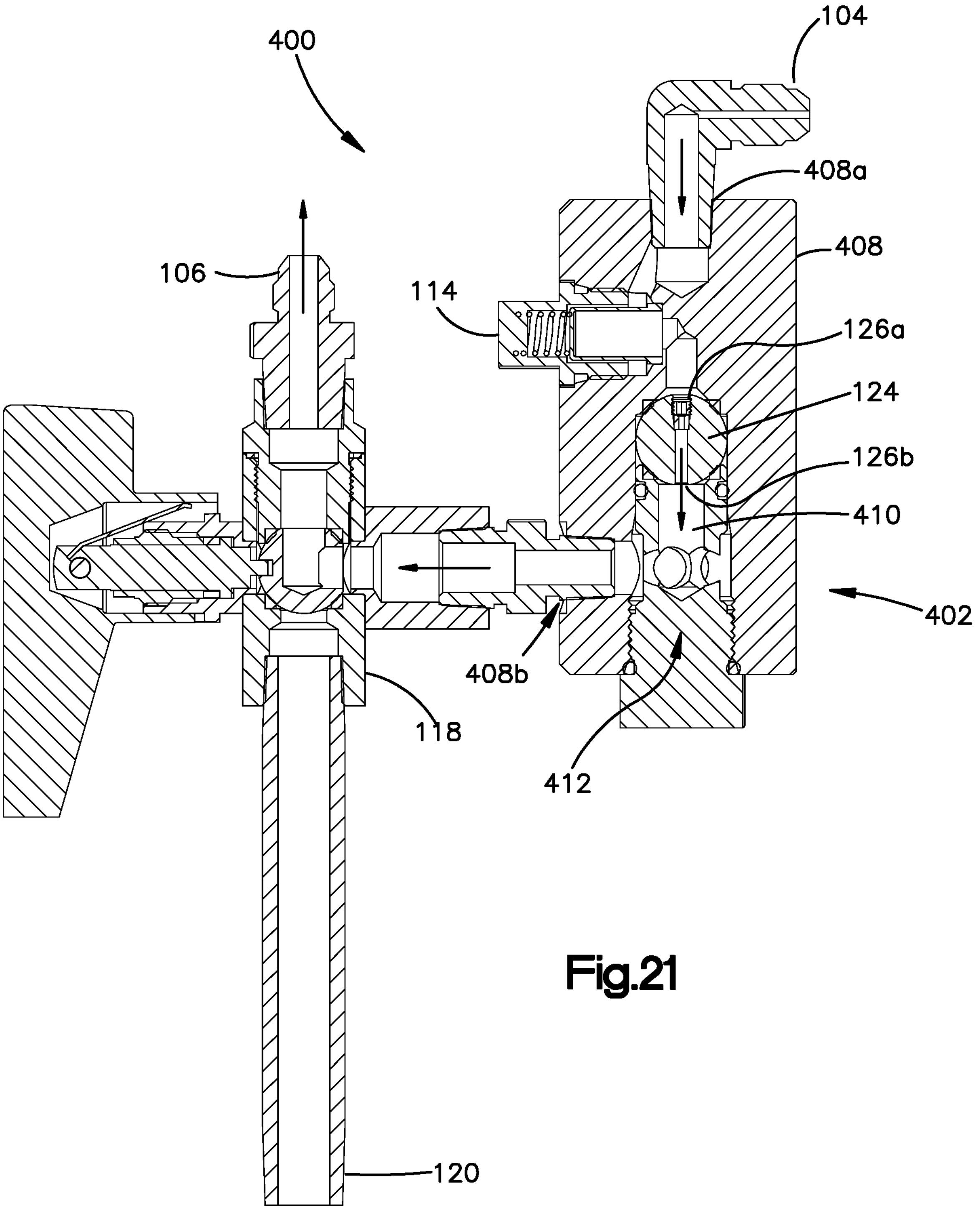
FIG. 21 shows a cross-sectional view of the spray pressure control manifold of FIG. 19.

Referring to FIGS. 19-21, a spray pressure control manifold 400 is shown according to another example. Similar to the embodiments above, the spray pressure control manifold 400 comprises a flow restrictor 402 that reduces pressure fluctuations in the fluid system. However, in this example, the manifold housing 408 is also the housing of the flow restrictor 402 (unlike in FIG. 2, where the housing 122 is separate from the manifold housing 108). Like the flow restrictor 102, the flow restrictor 402 can be selectively operated in a first orientation, wherein a restricting orifice (e.g., 130 in FIG. 10) of the flow restrictor 402 is oriented to restrict a flow of fluid through the pressure control manifold 400, and a second orientation, wherein the restricting orifice is oriented so as to be flushed to remove clogs that arise when the flow restrictor 402 is in the first orientation. The flow restrictor 402 can be transitioned between the first and second orientations without disassembling the manifold 400.

The spray pressure control manifold 400 can have a manifold inlet 104, and a manifold outlet 106 that is downstream of the manifold inlet 104 with respect to a fluid flow path, which may also be referred to as a fluid flow direction or a downstream direction, of fluid through the manifold 400. The flow path or flow direction is indicated by the arrows in FIG. 21. The manifold inlet 104 and manifold outlet 106 can be configured as described above.

The flow restrictor 402 of the manifold 400 can have a housing 408. The housing 408 can be disposed along the flow path between the manifold inlet 104 and the manifold outlet 106. The housing 408 can have an inlet 408*a* and an outlet 408*b*. The housing 408 can define a passageway 410 or channel therethrough that defines at least a portion of the flow path of the manifold 400. The passageway 410 can extend from the inlet 408*a* to the outlet 408*b*. Thus, the passageway 410 can be in fluid communication with the manifold inlet 104 and the manifold outlet 106. The housing 408 can support a rotatable body 124 therein such that the restricting orifice of the flow restrictor 102 is disposed within the flow path. The rotatable body 124 can be configured in a manner similar to that described above. For example, the housing 408 can define a recess 412 therein that is configured to receive the rotatable body 124. The recess 412 can be disposed within the passageway 410 of the housing 408. The recess 412 can be configured to receive the rotatable body 124 so as to place the restricting orifice of the rotatable body 124 in-line with the passageway 410. The manifold 400 is configured such that the flow restrictor 402 receives fluid flow at a first pressure from the manifold inlet 104 along the fluid flow path, and discharges fluid flow at a second pressure towards the manifold outlet 106 along the fluid flow path, the second pressure being lower than the first pressure. Thus, the flow restrictor 402 is configured to reduce a pressure of the fluid as the fluid flows through the flow restrictor along the fluid flow path. The first pressure can be referred to as a higher pressure, and the second pressure can be referred to as a lower pressure.

The manifold 400 can comprise a filter 114 disposed along the flow path. The filter 114 can be disposed between the manifold inlet 104 and the rotatable body 124. Thus, the rotatable body 124 can be downstream of the filter 114. The filter 114 can be configured to filter the fluid before the fluid passes along the flow path to the rotatable body 124. The filter 114 can filter the fluid so as to prevent debris from clogging the restricting orifice of the flow restrictor 102. In one example, the housing 408 can be configured to support the filter 114. For example, the housing 408 can define a recess 116 therein that is configured to receive at least a portion of the filter 114. The housing 408 can support the filter 114 such that a filter element of the filter 114 is disposed within the flow path. The recess 116 can be open to, and in fluid communication with, the passageway 410 of the housing 408. The recess 116 can be configured to receive the filter 114 such that the filter element of the filter 114 is in-line with the passageway 410. In alternative examples, the filter 114 can be supported upstream of the housing 408.

The manifold 400 can comprise a three-way ball valve 118 disposed along the fluid flow path. The three-way ball valve 118 can be disposed along the flow path between the housing 408 and the manifold outlet 106. Thus, the three-way ball valve 118 can be downstream of the housing 408 and/or the flow restrictor 402. The three-way ball valve 118 can selectively operate in a first configuration (as shown in FIG. 21), wherein the three-way ball valve 118 communicates the fluid along the fluid flow path towards the manifold outlet 106, and a second orientation (not shown), wherein the three-way ball valve 118 diverts fluid flow from the fluid flow path to a second manifold outlet 120. In one example, the second manifold outlet 120 can lead to a drain and can be used when flushing the manifold 400.

Figure 23:
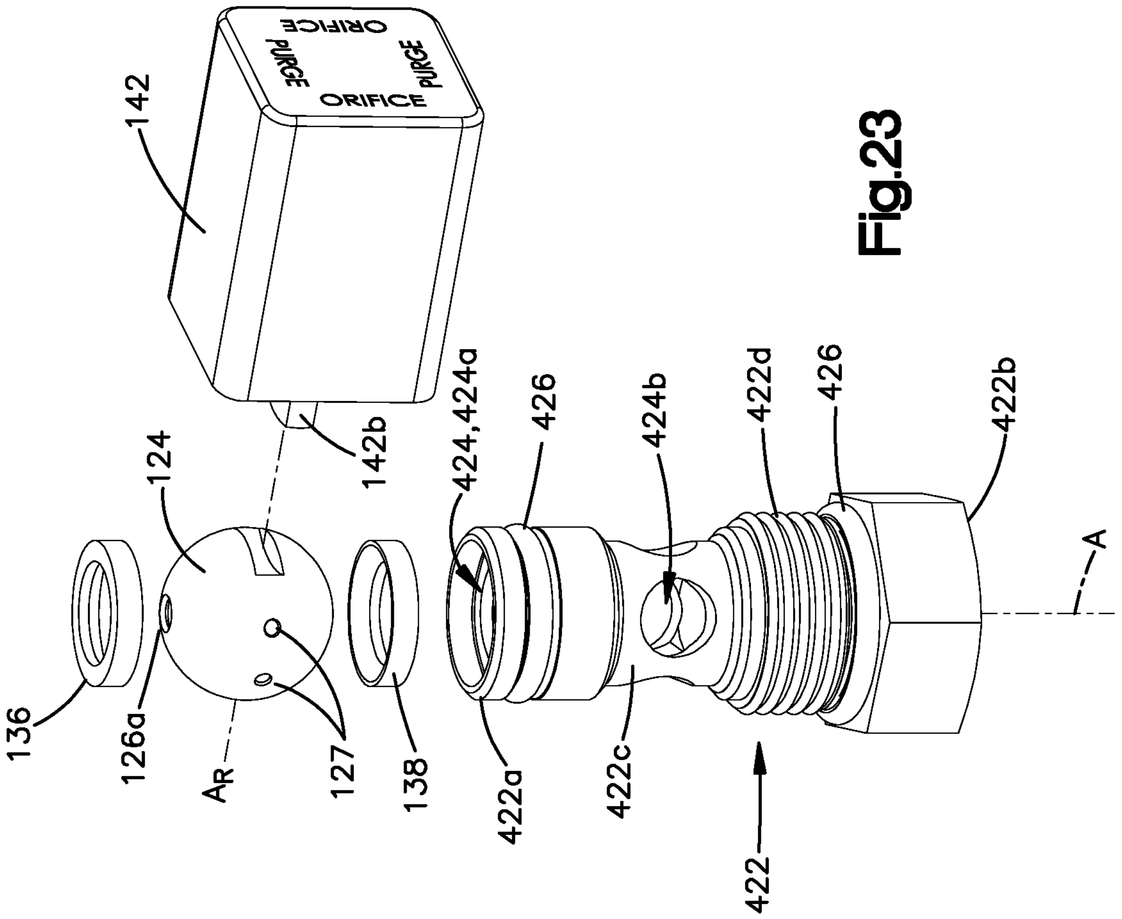
FIG. 23 shows an exploded perspective view of components of a flow restrictor of the spray pressure control manifold of FIG. 19 according to one example with a housing of the flow restrictor removed.
Figure 22:
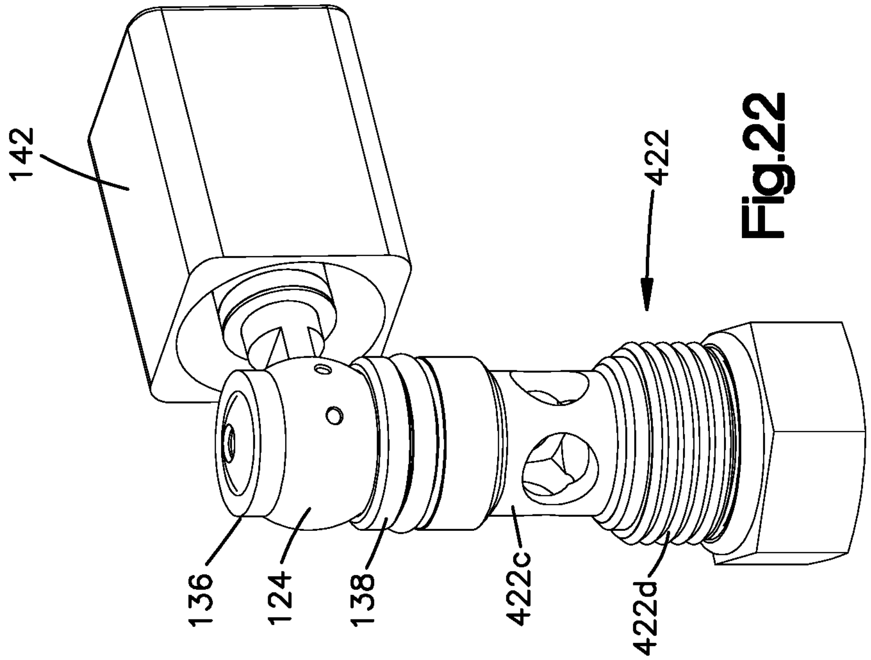
FIG. 22 shows a perspective view of components of a flow restrictor of the spray pressure control manifold of FIG. 19 according to one example with a housing of the flow restrictor removed.

Turning now to FIGS. 22 and 23, the fluid flow restrictor 402 can comprise a plug 422. The plug 422 can be configured to retain the rotatable body 124 in the recess 412 of the housing 408. The plug 422 can have a first end 422*a*, and a second end 422*b* that is offset from the first end 422*a*. The first and second ends 422*a* and 422*b* can be offset from one another along a central axis $A_P$. The first end 422*a* of the plug 422 can be configured to support the rotatable body 124 such that the rotatable body 124 can rotate about the axis of rotation $A_R$. In one example, the first end 422*a* can support a seat 138 that is configured as described above and is configured to receive a portion of the rotatable body 124 such that the rotatable body 124 rotates within the seat 138. The flow restrictor 402 can additionally or alternatively include a seat 136 that is configured to support the rotatable body 124 opposite the seat 138. The seat 136 can be positioned at an upstream side of the rotatable body 124, while the seat 138 can be positioned at a downstream side of the rotatable body 124.

The plug 422 can have an outer curved surface 422*c* between the first and second ends 422*a* and 422*b*. The outer surface 422*c* can be curved about the central axis $A_P$. The plug 422 can have a generally cylindrical shape, although other shapes are contemplated. The outer surface 422*c* can define threading 422*d* thereon that is configured engage threading of the recess 412 of the housing 408. The second end 422*b* can have a drive surface that is configured to be engaged by a drive instrument (not shown) so as to drive the plug 422 into the recess 412 of the housing 408. The drive surface can have a non-circular cross-sectional shape, such as (without limitation) a hexagonal shape, a star shape, a plus shape, or other suitable shape.

The plug 422 can have a channel 424 therethrough. The channel 424 can extend into the first end 422*a*. The channel 424 can extend towards the second end 422*b*, and terminate before the second end 422*b*. The channel 424 can extend through the outer surface 422*c*. In other words, the channel 424 can have an inlet 424*a* at the first end 422*a* and an outlet 424*b* at the outer surface 422*c*, between the first and second ends 422*a* and 422*b*. When the plug 422 is received in the recess 412, the channel 424 is in fluid communication with the passageway 410 of the housing 408. The plug 422 can support at least one seal 426, such as at least one O-ring, that is configured to provide a seal between the outer surface 422*c* and the recess 412. For example, the plug 422 can support a pair of seals 426 disposed on opposed sides of the outlet 424*b* of the channel 424 to prevent leakage from the outlet 424*b*.

Referring to FIGS. 20 and 21, the housing 408 can define a cross-channel 428 that extends into the housing 408 along the axis of rotation $A_R$. The cross-channel 428 can be open to the housing channel or passageway 410. The flow restrictor 402 can comprise a handle 142 that is configured to transition the rotatable body 124 between 1) the first orientation (shown in FIG. 11) in which the bore outlet 126*b* is offset from the bore inlet 126*a* along the fluid flow direction and 2) the second orientation (shown in FIG. 12) in which the bore inlet 126*a* is offset from the bore outlet 126*b* along the fluid flow direction. The cross-channel 428 can be configured to receive at least a portion of the handle 142 such that the handle 142 is coupled to the rotatable body 124 when the rotatable body 124 is received in the housing channel 122*c*. The handle 142 can be configured in a manner similar to that described above in relation to FIGS. 1-17.

The rotatable body 124 can be transitioned between a first orientation (shown in FIG. 21) and a second orientation in a manner similar to that discussed above in relation to FIGS. 1-17. Further, the rotatable body 124, and hence the flow restrictor 402, can be optionally configured to be operated in a third orientation and/or a fourth orientation as described above in relation to FIGS. 1-17.

Various aspects of the present disclosure can be understood in view of the following examples:

Example 1: A fluid flow restrictor of a spray pressure control system, the fluid flow restrictor comprising:

a housing comprising a housing inlet, a housing outlet offset from the housing inlet along a fluid flow direction, and a housing channel that extends between the housing inlet and housing outlet; and a rotatable body disposed in the housing channel between the housing inlet and the housing outlet, the rotatable body having an outer surface that is curved about an axis of rotation, the rotatable body defining a bore that extends entirely through the rotatable body such that the bore defines a bore inlet at the outer surface, and a bore outlet at the outer surface that is offset from the bore inlet, wherein the rotatable body is rotatable between 1) a first orientation in which the bore outlet is offset from the bore inlet along the fluid flow direction, and 2) a second orientation in which the bore inlet is offset from the bore outlet along the fluid flow direction.

Example 2: The fluid flow restrictor of Example 1, wherein the housing inlet and housing outlet are offset from one another along a housing axis that is angularly offset from the axis of rotation.

Example 3: The fluid flow restrictor of any of Examples 1 and 2, wherein the housing axis is substantially perpendicular to the axis of rotation.

Example 4: The fluid flow restrictor of any of Examples 1 to 3, wherein the bore inlet and the bore outlet are offset from one another along an axis that is substantially parallel to the housing axis when the rotatable body is in each of the first and second orientations.

Example 5: The fluid flow restrictor of any of Examples 1 to 4, wherein the housing has a housing body that has a first end and a second end that are offset from one another along the axis of rotation, and an outer surface that is curved about the axis of rotation.

Example 6: The fluid flow restrictor of Example 5, wherein the outer surface defines at least one recess that is configured to receive a seal therein so as to form a seal between the housing and an inner surface of a manifold housing of the spray pressure control system.

Example 7: The fluid flow restrictor of Example 6, wherein the at least one recess includes an angled recess that lies in a plane that forms a non-right angle with the axis of rotation, and the angled recess is angled relative to a central axis of the housing channel such a portion of the angled recess is positioned between the housing inlet and the second end of the housing body, and a portion of the recess is positioned between the housing outlet and the first end of the housing body.

Example 8: The fluid flow restrictor of any of Examples 1 to 7, comprising a handle that is configured to be rotated to transition the rotatable body between the first and second orientations.

Example 9: The fluid flow restrictor of any of Examples 1 to 8, wherein the rotatable body has an outer surface that has a substantially spherical shape.

Example 10: The fluid flow restrictor of any of Examples 1 to 9, comprising an interior surface disposed in the bore, the interior surface defining an orifice having a cross-sectional dimension that is less than a cross-sectional dimension of the bore such that the orifice is configured to restrict a flow of fluid as the fluid flows between the bore inlet and the bore outlet.

Example 11: The fluid flow restrictor of Example 10, comprising a holder that comprises the interior surface that defines the orifice, wherein the holder is configured to be removably supported in the bore of the rotatable body.

Example 12: The fluid flow restrictor of any of Examples 1 to 11, wherein the rotatable body is transitioned between the first and second orientations by rotating the rotatable body about 180 degrees about the axis of rotation.

Example 13: The fluid flow restrictor of any of Examples 1 to 12, wherein the rotatable body defines at least one bypass bore that extends through the rotatable body, each bypass bore being angularly offset from the bore.

Example 14: The fluid flow restrictor of Example 13, wherein each bypass bore extends along a central axis that extends along a direction that is perpendicular to a central axis of the bore.

Example 15: The fluid flow restrictor of Example 13, wherein the rotatable body is configured to be operated in a third orientation in which the at least one bypass bore is arranged in-line with the fluid flow from the housing inlet to the housing outlet such that the at least one bypass bore is in fluid communication with the housing inlet and the housing outlet.

Example 16: The fluid flow restrictor of Example 15, wherein the rotatable body can be transitioned between 1) at least one of the first or second orientations and 2) the third orientation by rotating the rotatable body by about 90 degrees about the axis of rotation.

Example 17: A system comprising:

- the fluid flow restrictor of any of Examples 1 to 16; and
- a manifold defining a passageway therethrough, and a recess that extends into the manifold housing such that the recess is open to the passageway, the recess being configured to support the fluid flow restrictor therein such that the bore of the fluid flow restrictor is in fluid communication with the passageway.

Example 18: The fluid flow restrictor of any of Examples 1 and 8-16, wherein the fluid flow restrictor comprises a plug that is configured to retain the rotatable body in a recess of the housing.

Example 19: The fluid flow restrictor of Example 18, wherein the plug has a first end, and a second end that is offset from the first end along a central axis, the first end of the plug is configured to support the rotatable body such that the rotatable body can rotate about the axis of rotation.

Example 20: The fluid flow restrictor of Example 19, wherein the plug has an outer surface between the first and second ends of the plug, and the plug defines a channel that extends into the first end of the plug and out the outer surface.

Example 21: A method of flushing a fluid flow restrictor of a spray pressure control system, the fluid flow restrictor comprising a housing having a housing inlet, a housing outlet offset from the housing inlet along a fluid flow direction, and a housing channel that extends between the housing inlet and housing outlet, the method comprising:

- rotating a rotatable body within the housing channel about an axis of rotation, the rotatable body defining a bore that extends entirely through the rotatable body such that the bore defines a bore inlet at an outer surface of the rotatable body and a bore outlet at the outer surface that is offset from the bore inlet, wherein the rotating step comprises rotating the rotatable body about the axis of rotation from a first orientation in which the bore outlet is offset from the bore inlet along the fluid flow direction to a second orientation in which the bore inlet is offset from the bore outlet along the fluid flow direction; and
- flowing fluid through the fluid flow restrictor such that the fluid flows from the bore outlet to the bore inlet.

Example 22: The method of Example 21, comprising, before the rotating step, flowing fluid through the fluid flow restrictor such that the fluid flows to the bore inlet at a first pressure, from the bore inlet to the bore outlet, out the bore outlet at a second pressure, less than the first pressure.

Example 23: The method of any of Examples 21 and 22, wherein the rotating step comprises rotating the rotatably body by approximately 180 degrees.

It should be noted that the illustrations and descriptions of the examples shown in the figures are for exemplary purposes only and should not be construed limiting the disclosure. One skilled in the art will appreciate that the present disclosure contemplates various examples. Additionally, it should be understood that the concepts described above with the above-described examples may be employed alone or in combination with any of the other examples described above. It should further be appreciated that the various alternative examples described above with respect to one illustrated example can apply to all examples as described herein, unless otherwise indicated.

Unless explicitly stated otherwise, each numerical value and range should be interpreted as being approximate as if the word "about," "approximately," or "substantially" preceded the value or range.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include these features, elements and/or steps. The terms "comprising," "including," "having," and the like are synonymous and are used inclusively, in an open-ended fashion, and do not exclude additional elements, features, acts, operations, and so forth.

While certain examples have been described, these examples have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various examples of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be understood that reference herein to "a" or "one" to describe a feature such as a component or step does not foreclose additional features or multiples of the feature. For instance, reference to a device having or defining "one" of a feature does not preclude the device from having or defining more than one of the feature, as long as the device has or defines at least one of the feature. Similarly, reference herein to "one of" a plurality of features does not foreclose the invention from including two or more, up to all, of the features. For instance, reference to a device having or defining "one of a X and Y" does not foreclose the device from having both the X and Y.

What is claimed:

1. A fluid flow restrictor of an associated spray pressure control system, the fluid flow restrictor comprising:

a housing comprising a housing inlet, a housing outlet offset from the housing inlet along a fluid flow direction, and a housing channel extending between the housing inlet and the housing outlet; and a rotatable body disposed in the housing channel between the housing inlet and the housing outlet, the rotatable body having an outer surface curved about an axis of rotation, the rotatable body defining:

a bore extending entirely through the rotatable body such that the bore defines a bore inlet at the outer surface, and a bore outlet at the outer surface offset from the bore inlet; and at least one bypass bore extending through the rotatable body angularly offset from the bore, wherein the rotatable body is rotatable between 1) a first orientation in which the bore outlet is offset from the bore inlet along the fluid flow direction, 2) a second orientation in which the bore inlet is offset from the bore outlet along the fluid flow direction, and 3) a third orientation in which the at least one bypass bore is arranged in-line with a fluid flow from the housing inlet to the housing outlet such that the at least one bypass bore is in fluid communication with the housing inlet and the housing outlet, and in which the rotatable body is configured to output the fluid flow to the housing outlet at a higher flow rate than when in the first orientation or the second orientation.

2. The fluid flow restrictor of claim 1, wherein the bore inlet and the bore outlet are offset from one another along a bore axis that is angularly offset from the axis of rotation.

3. The fluid flow restrictor of claim 1, wherein the fluid flow restrictor comprises a plug that is configured to retain the rotatable body in a recess of the housing.

4. The fluid flow restrictor of claim 3, wherein the plug has a first end, and a second end that is offset from the first end along a central axis, the first end of the plug is configured to support the rotatable body such that the rotatable body can rotate about the axis of rotation.

5. The fluid flow restrictor of claim 1, wherein the housing comprises a housing body having (a) a first end and a second end that are offset from one another along the axis of rotation, and (b) an outer surface extending about the axis of rotation.

6. The fluid flow restrictor of claim 5, wherein the outer surface of the housing body defines at least one recess that is configured to receive a seal therein so as to form a seal between the housing and an inner surface of an associated manifold housing of the associated spray pressure control system.

7. The fluid flow restrictor of claim 6, wherein the at least one recess includes an angled recess that lies in a plane that forms a non-right angle with the axis of rotation, and the angled recess is angled relative to a central axis of the housing channel such a portion of the angled recess is positioned between the housing inlet and the second end of the housing body, and a portion of the recess is positioned between the housing outlet and the first end of the housing body.

8. The fluid flow restrictor of claim 1, comprising a handle that is configured to be rotated to transition the rotatable body between the first orientation and the second orientation.

9. The fluid flow restrictor of claim 1, wherein the outer surface of the rotatable body has a substantially spherical shape.

10. The fluid flow restrictor of claim 1, comprising an interior surface disposed between the bore inlet and the bore outlet of the bore and defining an orifice having a cross-sectional dimension that is less than a cross-sectional dimension of the bore such that the orifice is configured to restrict a flow of fluid as the flow of fluid flows between the bore inlet and the bore outlet, wherein the orifice defines a first cross-sectional area that is less than a second cross-sectional area defined by the at least one bypass bore.

11. The fluid flow restrictor of claim 10, comprising a holder that comprises the interior surface that defines the orifice, wherein the holder is configured to be removably supported in the bore of the rotatable body.

12. The fluid flow restrictor of claim 1, wherein the rotatable body is rotatable between the first orientation and the second orientation by rotating the rotatable body about 180 degrees about the axis of rotation.

13. The fluid flow restrictor of claim 1, wherein each of the at least one bypass bore extends along a central axis extending along a direction that is perpendicular to a central axis of the bore.

14. A system comprising:

the fluid flow restrictor of claim 1; and a manifold housing defining a passageway therethrough, and a recess extending into the manifold housing such that the recess is open to the passageway, the recess being configured to support the fluid flow restrictor therein such that the bore of the fluid flow restrictor is in fluid communication with the passageway.

15. The fluid flow restrictor of claim 1, wherein the at least one bypass bore is offset from the bore such that the at least one bypass bore is configured to not be in fluid communication with the bore.

16. A fluid flow restrictor of an associated spray pressure control system, the fluid flow restrictor comprising:

a housing comprising a housing inlet, a housing outlet offset from the housing inlet along a fluid flow direction, and a housing channel extending between the housing inlet and the housing outlet; and a rotatable body disposed in the housing channel between the housing inlet and the housing outlet, the rotatable body having an outer surface curved about an axis of rotation, the rotatable body defining:

a bore extending entirely through the rotatable body such that the bore defines a bore inlet at the outer surface, and a bore outlet at the outer surface offset from the bore inlet, wherein the rotatable body is rotatable between 1) a first orientation in which the bore outlet is offset from the bore inlet along the fluid flow direction, and 2) a second orientation in which the bore inlet is offset from the bore outlet along the fluid flow direction, wherein the housing has a housing body that has a first end and a second end that are offset from one another along the axis of rotation, and an outer surface extending about the axis of rotation, wherein the outer surface defines at least one recess that is configured to receive a seal therein so as to form a seal between the housing and an inner surface of a manifold housing of the associated spray pressure control system, and wherein the at least one recess includes an angled recess lying in a plane forming a non-right angle with the axis of rotation, the angled recess is angled relative to a central axis of the housing channel such a portion of the angled recess is positioned between the housing inlet and the second end of the housing body, and a portion of the recess is positioned between the housing outlet and the first end of the housing body.

17. The fluid flow restrictor of claim 16, wherein the rotatable body defines at least one bypass bore extending through the rotatable body, each bypass bore being angularly offset from the bore, and wherein the rotatable body is configured to be operated in a third orientation in which the at least one bypass bore is arranged in-line with a fluid flow from the housing inlet to the housing outlet such that the at least one bypass bore is in fluid communication with the housing inlet and the housing outlet.

18. A method of flushing a fluid flow restrictor of a spray pressure control system, the fluid flow restrictor comprising a housing having a housing inlet, a housing outlet offset from the housing inlet along a fluid flow direction, and a housing channel that extends between the housing inlet and housing outlet, the method comprising:

rotating a rotatable body within the housing channel about an axis of rotation, the rotatable body defining 1) a bore that extends entirely through the rotatable body such that the bore defines a bore inlet at an outer surface of the rotatable body and a bore outlet at the outer surface that is offset from the bore inlet, and 2) at least one bypass bore extending through the rotatable body angularly offset from the bore, wherein the rotating a rotatable body comprises rotating the rotatable body about the axis of rotation from a first orientation in which the bore outlet is offset from the bore inlet along the fluid flow direction to a second orientation in which the bore inlet is offset from the bore outlet along the fluid flow direction;

flowing fluid through the fluid flow restrictor such that the fluid flows from the bore outlet to the bore inlet; and further rotating the rotatable body within the housing channel about the axis of rotation to a third orientation in which the at least one bypass bore is arranged in-line with the fluid flowing from the housing inlet to the housing outlet such that the at least one bypass bore is in fluid communication with the housing inlet and the housing outlet, and in which the rotatable body outputs the fluid flowing to the housing outlet at a higher flow rate than when in the first orientation or the second orientation.

19. The method of claim 18, comprising, before the rotating a rotatable body, flowing fluid through the fluid flow restrictor such that the fluid flows into the bore inlet at a first pressure, from the bore inlet to the bore outlet, and out the bore outlet at a second pressure, less than the first pressure.

20. The method of claim 18, wherein the rotating a rotatable body comprises rotating the rotatable body by approximately 180 degrees.

* * * * *